(12) United States Patent
Hirota et al.

(10) Patent No.: US 6,823,665 B2
(45) Date of Patent: Nov. 30, 2004

(54) EXHAUST GAS PURIFICATION DEVICE

(75) Inventors: Shinya Hirota, Susono (JP); Toshiaki Tanaka, Numazu (JP); Kazuhiro Itoh, Mishima (JP); Takamitsu Asanuma, Susono (JP); Koichiro Nakatani, Susono (JP); Koichi Kimura, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/088,476

(22) PCT Filed: Jul. 23, 2001

(86) PCT No.: PCT/JP01/06350

§ 371 (c)(1),
(2), (4) Date: Mar. 20, 2002

(87) PCT Pub. No.: WO02/08581

PCT Pub. Date: Jan. 31, 2002

(65) Prior Publication Data

US 2002/0170287 A1 Nov. 21, 2002

(30) Foreign Application Priority Data

| Jul. 24, 2000 | (JP) | 2000-227558 |
| Jul. 24, 2000 | (JP) | 2000-227569 |
| Apr. 27, 2001 | (JP) | 2001-133597 |
| May 10, 2001 | (JP) | 2001-140559 |

(51) Int. Cl.$^7$ .................................................. F01N 3/00
(52) U.S. Cl. ........................ 60/296; 60/285; 60/288; 60/297; 60/311
(58) Field of Search ..................... 60/274, 285, 286, 60/287, 288, 296, 297, 311

(56) References Cited

U.S. PATENT DOCUMENTS

| 2,946,651 A | * | 7/1960 | Houdry ........................ 60/296 |
| 3,189,417 A | * | 6/1965 | Houdry et al. ................ 60/296 |
| 3,796,546 A | * | 3/1974 | Poullot et al. ................ 60/296 |
| 5,489,319 A | * | 2/1996 | Tokuda et al. ................ 60/311 |
| 5,582,002 A | * | 12/1996 | Pattas .......................... 60/288 |
| 6,167,696 B1 | * | 1/2001 | Maaseidvaag et al. ........ 60/311 |
| 6,314,722 B1 | * | 11/2001 | Matros et al. ................ 60/296 |

FOREIGN PATENT DOCUMENTS

| EP | 0 703 352 A2 | 3/1996 |
| EP | 0 984 142 A1 | 3/2000 |
| FR | 2 774 424 A1 | 8/1999 |
| JP | A-58-222907 | 12/1983 |
| JP | A-59-20510 | 2/1984 |
| JP | U-60-45815 | 3/1985 |
| JP | A-60-206925 | 10/1985 |
| JP | U-1-174510 | 7/1989 |
| JP | A-5-1613 | 1/1993 |
| JP | A 6-159037 | 6/1994 |
| JP | A 6-272541 | 9/1994 |
| JP | 7-4225 | * 1/1995 |
| JP | A 7-269328 | 10/1995 |
| JP | JP 7-269328 | 10/1995 |
| JP | B2 7-106290 | 11/1995 |
| JP | A 9-94434 | 4/1997 |
| JP | A 10-54268 | 2/1998 |
| JP | A 11-300165 | 11/1999 |
| JP | B2 3012249 | 12/1999 |
| JP | A 2000-18026 | 1/2000 |
| JP | JP 2000087736 | 3/2000 |

* cited by examiner

Primary Examiner—Tu M. Nguyen
(74) Attorney, Agent, or Firm—Oliff & Berridge, PLC

(57) ABSTRACT

An exhaust gas purification apparatus, for an engine having a combustion chamber, comprising an exhaust passage, a particulate filter arranged in the exhaust passage for removing particulate in exhaust gas exhausted from the combustion chamber by oxidation, and a device for controlling the characteristics of the exhaust gas flowing into the particulate filter, wherein, when the judging means judges that the particulate filter will be deteriorated by heat, the controlling device changes the characteristics of the exhaust gas flowing into the particulate filter to prevent the particulate filter from being deteriorated by heat.

12 Claims, 30 Drawing Sheets

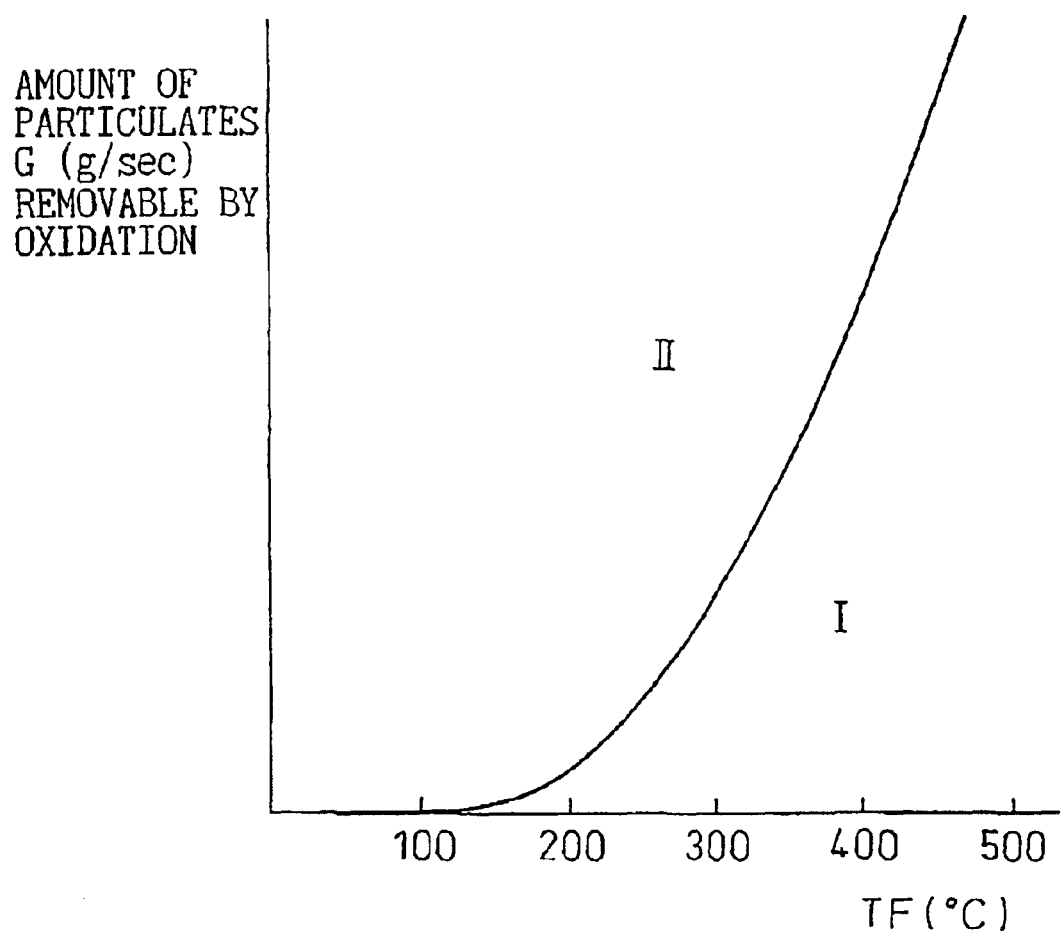

| $[O_2]_{11}$ | $[O_2]_{12}$ | ------ | $[O_2]_{1n}$ |
| $[O_2]_{21}$ | | | |
| ⋮ | | | ⋮ |
| $[O_2]_{m1}$ | ---------- | | $[O_2]_{mn}$ |

| $[NO]_{11}$ | $[NO]_{12}$ | -------- | $[NO]_{1n}$ |
| $[NO]_{21}$ | | | |
| ⋮ | | | ⋮ |
| $[NO]_{m1}$ | ------------ | | $[NO]_{mn}$ |

N

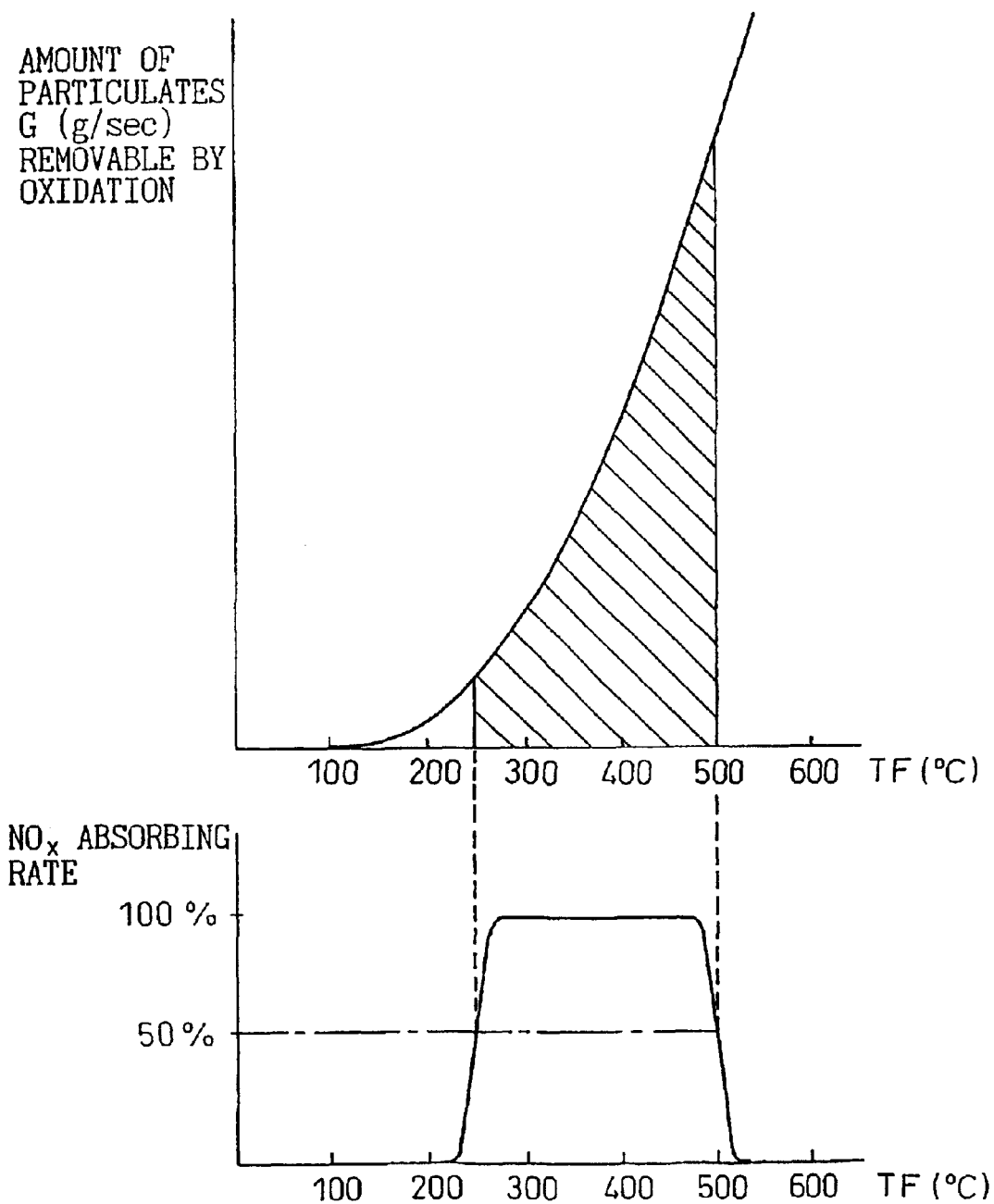

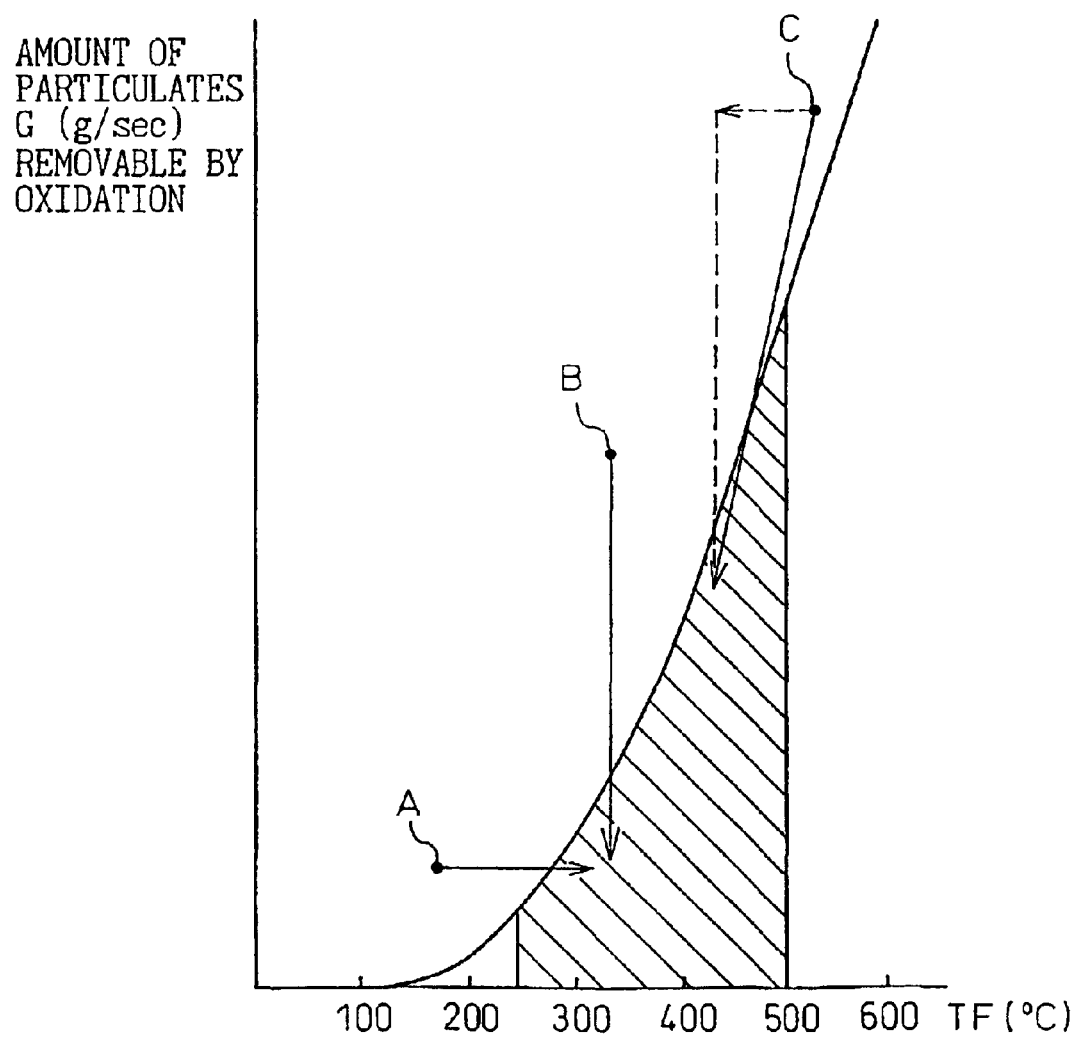

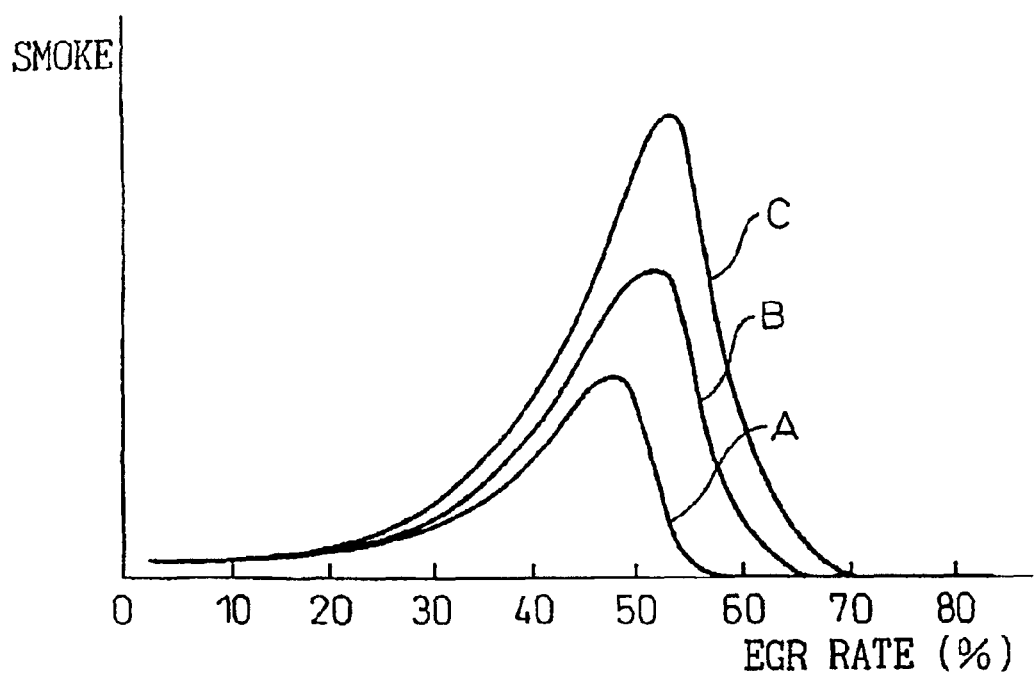

Fig.18

TQ | $A_{11}$  $A_{12}$  - - - - - - - - - -  $A_{1n}$
   | $A_{21}$                                $\vdots$
   | $\vdots$                                $\vdots$
   | $A_{m1}$  - - - - - - - - - - - - - -  $A_{mn}$
   |_____ N

EXHAUST GAS PURIFICATION DEVICE

TECHNICAL FIELD

The present invention relates to an exhaust gas purification device of an engine.

BACKGROUND ART

In the related art, in a diesel engine, particulates contained in the exhaust gas are removed by arranging a particulate filter in the engine exhaust passage, using that particulate filter to trap the particulates in the exhaust gas, and igniting and burning the particulates trapped on the particulate filter to recycle the particulate filter. The particulates trapped on the particulate filter, however, do not ignite unless the temperature becomes as high as at least about 600° C. However, the temperature of the exhaust gas of a diesel engine is normally considerably lower than 600° C. Therefore, it is difficult to use the heat of the exhaust gas to cause the particulates trapped on the particulate filter to ignite. To use the heat of the exhaust gas to cause the particulates trapped on the particulate filter to ignite, it is necessary to lower the ignition temperature of the particulates.

It has been known in the related art, however, that the ignition temperature of particulates can be reduced if a catalyst is carried on the particulate filter. Therefore, known in the art are various particulate filters carrying catalysts for reducing the ignition temperature of the particulates.

For example, Japanese Examined Patent Publication (Kokoku) No. 7-106290 discloses a particulate filter comprising a particulate filter carrying a mixture of a platinum group metal and an alkali earth metal oxide. In this particulate filter, the particulates are ignited at a relatively low temperature of about 350° C. to 400° C. and are then continuously burned.

Summarizing the problem to be solved by the invention, in a diesel engine, when the load becomes high, the temperature of the exhaust gas reaches from 350° C. to 400° C., therefore with the above particulate filter, it would appear at first glance that the particulates could be made to ignite and burn by the heat of the exhaust gas when the engine load becomes high. In fact, however, even if the temperature of the exhaust gas reaches from 350° C. to 400° C., sometimes the particulates will not ignite. Further, even if the particulates ignite, only some of the particulates will burn and a large amount of the particulates will remain unburned.

That is, when the amount of the particulates contained in the exhaust gas is small, the amount of the particulates deposited on the particulate filter is small. At this time, if the temperature of the exhaust gas reaches from 350° C. to 400° C., the particulates on the particulate filter ignite and then are continuously burned.

If the amount of the particulates contained in the exhaust gas becomes larger, however, before the particulates deposited on the particulate filter completely burn, other particulates will deposit on that particulates. As a result, the particulates deposit in layers on the particulate filter. If the particulates deposit in layers on the particulate filter in this way, the some of the particulates easily contacting the oxygen will be burned, but the remaining particulates which do not contact the oxygen will not burn and therefore a large amount of particulates will remain unburned. Therefore, if the amount of particulates contained in the exhaust gas becomes larger, a large amount of particulates continues to deposit on the particulate filter.

On the other hand, if a large amount of particulates is deposited on the particulate filter, the deposited particulates gradually become harder to ignite and burn. It probably becomes harder to burn in this way because the carbon in the particulates changes to hard-to-burn graphite etc. while being deposited. In fact, if a large amount of particulates continues to deposit on the particulate filter, the deposited particulates will not ignite at a low temperature of 350° C. to 400° C. A high temperature of over 600° C. is required to cause ignition of the deposited particulates. In a diesel engine, however, the temperature of the exhaust gas usually never becomes a high temperature of over 600° C. Therefore, if a large amount of particulates continues to deposit on the particulate filter, it is difficult to cause ignition of the deposited particulates by the heat of the exhaust gas.

On the other hand, at this time, if it were possible to make the temperature of the exhaust gas a high temperature of over 600° C., the deposited particulates would be ignited, but another problem would occur in this case. That is, in this case, if the deposited particulates were made to ignite, it would burn while generating a luminous flame. At this time, the temperature of the particulate filter would be maintained at over 800° C. for a long time until the deposited particulates finished being burned. If the particulate filter is exposed to a high temperature of over 800° C. for a long time in this way, however, the particulate filter will deteriorate quickly and therefore the problem will arise of the particulate filter having to be frequently replaced with a new filter.

DISCLOSURE OF INVENTION

An object of the present invention is to prevent a particulate filter of an exhaust purification apparatus from being deteriorated by heat derived from the burning of the particulates deposited on the particulate filter.

According to the present invention, there is provided an exhaust gas purification apparatus for an engine having a combustion chamber, comprising an exhaust passage, a particulate filter arranged in the exhaust passage for removing particulates in exhaust gas exhausted from the combustion chamber by oxidation, a device for controlling characteristic of the exhaust gas flowing into the particulate filter, and means for judging if the particulate filter will be deteriorated by heat derived from the oxidation of the particulates, wherein, when the judging means judges that the particulate filter will be deteriorated by heat, the controlling device changes the characteristic of the exhaust gas flowing into the particulate filter to prevent the particulate filter from being deteriorated by heat.

According to one embodiment of the invention, the controlling device can control the amount of the exhaust gas flowing into the particulate filter and when the judging means judges that the particular filter will be deteriorated by heat, the controlling device performs one of a first control operation to make the amount of the exhaust gas flowing into the particulate filter smaller than a first threshold, and a second control operation to make the amount of the exhaust gas flowing into the particulate filter larger than a second threshold which is larger than the first threshold.

According to another embodiment of the invention, when the judging means judges that the particulate filter will be deteriorated by heat, before the characteristic of the exhaust gas is changed by the controlling device, the judging means judges if the temperature of the particulate filter will become lower than the predetermined temperature by changing the characteristic of the exhaust gas, and if the concentration of the oxygen in the exhaust gas will become smaller than the predetermined concentration by changing the characteristic of the exhaust gas, and the controlling device changes the characteristic of the exhaust gas to make the temperature of the particulate filter lower than the predetermined temperature when the judging means judges that the temperature of the particulate filter will become lower than the predetermined temperature by changing the characteristic of the exhaust gas, and the controlling device changes the characteristic of the exhaust gas to make the concentration of the oxygen in the exhaust gas smaller than the predetermined concentration when the judging means judges that the concentration of the oxygen in the exhaust gas will become smaller than the predetermined concentration.

BRIEF DESCRIPTION OF DRAWINGS

These and other objects and features of the present invention will be more apparent from the following description given with reference to the accompanying drawings, wherein:

FIG. 6 is a view of the relationship between the amount of particulates removable by oxidation and the temperature of the particulate filter;

FIGS. 9A and 9B are views of maps of the concentration of oxygen and the concentration of $NO_x$ in the exhaust gas;

FIG. 11 is a view of a simultaneous particulate and $NO_x$ treatment region;

FIG. 12 is a view for explaining the method of removal by oxidation of particulates;

FIG. 13 is a view of the amount of generation of smoke;

FIG. 18 is a view of a map of an amount of $NO_x$ absorption;

BEST MODE FOR CARRYING OUT THE INVENTION

Figure 1:
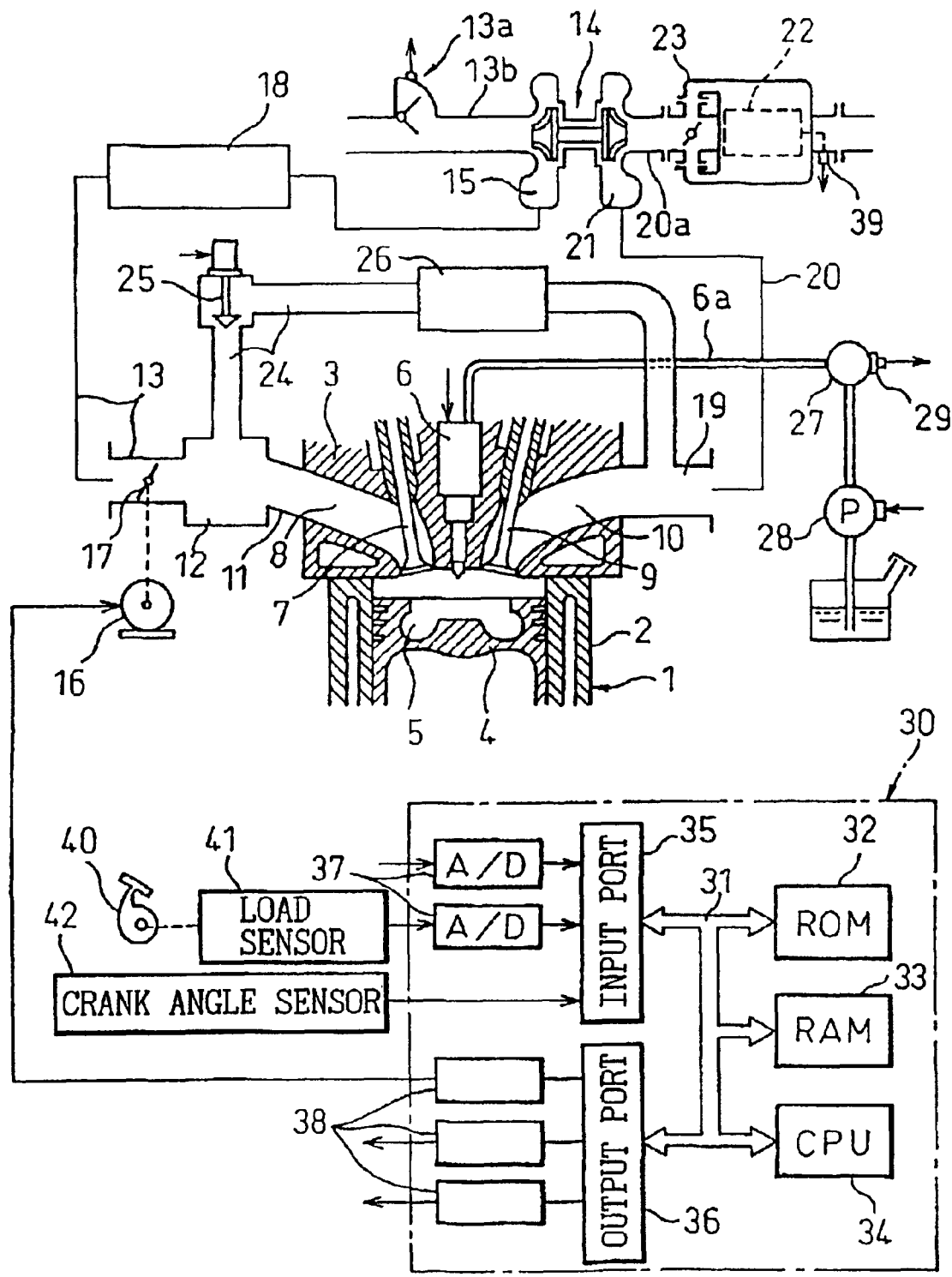
FIG. 1 is an overall view of an internal combustion engine.

FIG. 1 shows the case of application of the present invention to a compression ignition type internal combustion engine. Note that the present invention can also be applied to a spark ignition type internal combustion engine.

Referring to FIG. 1, 1 indicates an engine body, 2 a cylinder block, 3 a cylinder head, 4 a piston, 5 a combustion chamber, 6 an electrically controlled fuel injector, 7 an intake valve, 8 an intake port, 9 an exhaust valve, and 10 an exhaust port. The intake port 8 is connected to a surge tank 12 through a corresponding intake tube 11, while the surge tank 12 is connected to a compressor 15 of an exhaust turbocharger 14 through an intake duct 13. An airflow meter 13a for measuring a flow rate of the intake air is arranged in an intake pipe 13b upstream of the compressor 15. Inside the intake duct 13 is arranged a throttle valve 17 driven by a step motor 16. Further, a cooling device 18 is arranged around the intake duct 13 for cooling the intake air flowing through the intake duct 13. In the embodiment shown in FIG. 1, the engine coolant water flows inside the cooling device 18 and the intake air is cooled by the engine coolant water. On the other hand, the exhaust port 10 is connected to an exhaust turbine 21 of an exhaust turbocharger 14 through an exhaust manifold 19 and an exhaust pipe 20. The outlet of the exhaust turbine 21 is connected to a casing 23 housing a particulate filter 22 through an exhaust pipe 20a.

The exhaust manifold 19 and the surge tank 12 are connected to each other through an exhaust gas recirculation (EGR) passage 24. Inside the EGR passage 24 is arranged an electrically controlled EGR control valve 25. A cooling device 26 is arranged around the EGR passage 24 to cool the EGR gas circulating inside the EGR passage 24. In the embodiment shown in FIG. 1, the engine coolant water is guided inside the cooling device 26 and the EGR gas is cooled by the engine coolant water. On the other hand, fuel injectors 6 are connected to a fuel reservoir, a so-called common rail 27, through fuel feed pipes 6a. Fuel is fed into the common rail 27 from an electrically controlled variable discharge fuel pump 28. The fuel fed into the common rail 27 is fed to the fuel injectors 6 through the fuel feed pipes 6a. The common rail 29 has a fuel pressure sensor 29 attached to it for detecting the fuel pressure in the common rail 27. The discharge of the fuel pump 28 is controlled based on the output signal of the fuel pressure sensor 29 so that the fuel pressure in the common rail 27 becomes a target fuel pressure.

An electronic control unit 30 is comprised of a digital computer provided with a read only memory (ROM) 32, random access memory (RAM) 33, microprocessor (CPU) 34, input port 35, and output port 36 connected to each other through a bidirectional bus 31. The output signal of the fuel pressure sensor 29 is input through a corresponding AD converter 37 to the input port 35. Further, the particulate filter 22 has attached to it a temperature sensor 39 for detecting the particulate filter 22. The output signal of this temperature sensor 39 is input to the input port 35 through the corresponding AD converter 37. The output signal of the airflow meter 13a is input into the input port 35 through the corresponding AD converter 37. An accelerator pedal 40 has connected to it a load sensor 41 generating an output voltage proportional to the amount of depression L of the accelerator pedal 40. The output voltage of the load sensor 41 is input to the input port 35 through the corresponding AD converter 37. Further, the input port 35 has connected to it a crank angle sensor 42 generating an output pulse each time a crankshaft rotates by for example 30 degrees. On the other hand, the output port 36 is connected through corresponding drive circuits 38 to the fuel injectors 6, the step motor 16 for driving the throttle valve, the EGR control valve 25, and the fuel pump 28.

Figure 2A:
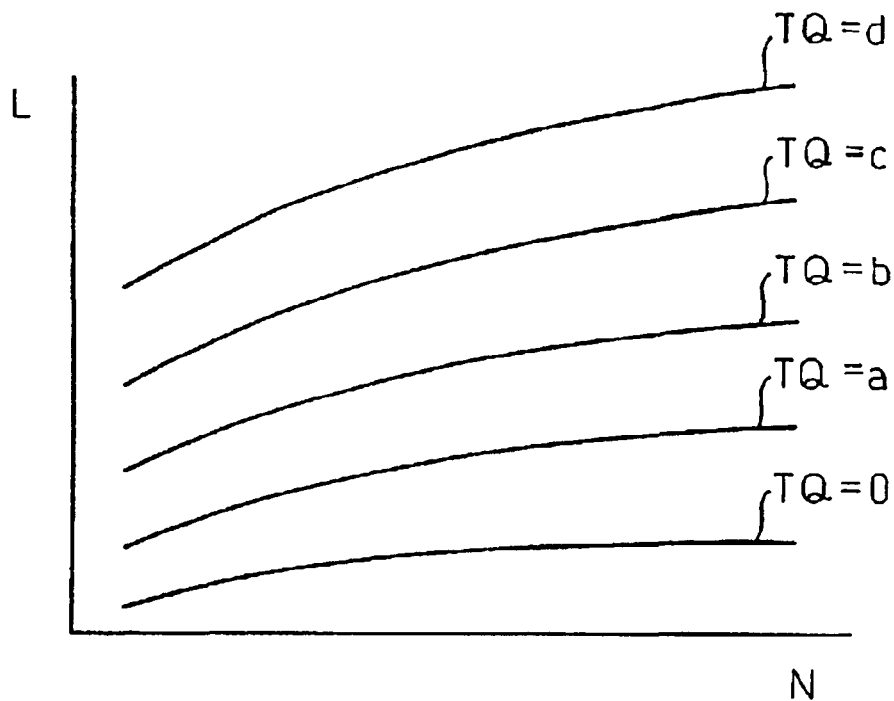
FIGS. 2A and 2B are views of the relationship between a required torque of an engine, an amount of depression of an accelerator pedal, and an engine speed.
Figure 2B:
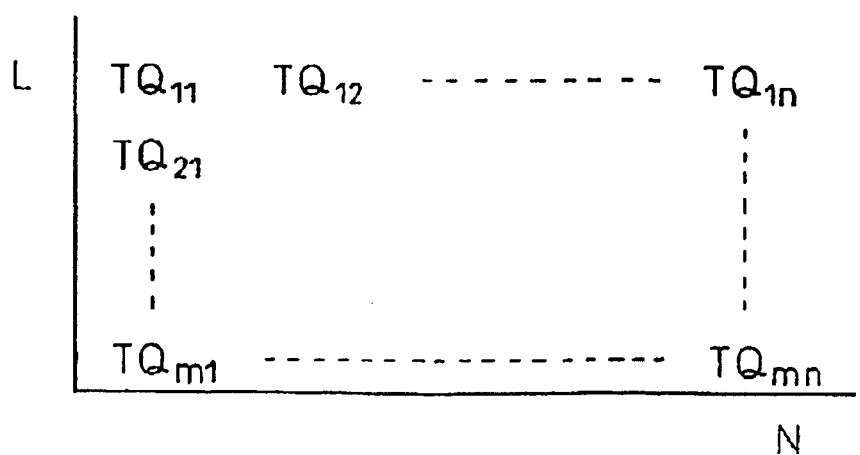

FIG. 2A shows the relationship between the required torque TQ, the amount of depression L of the accelerator pedal 40, and the engine speed N. Note that in FIG. 2A, the curves show the equivalent torque curves. The curve shown by TQ=0 shows the torque at zero, while the remaining curves show gradually increasing required torques in the order of TQ=a, TQ=b, TQ=c, and TQ=d. The required torque TQ shown in FIG. 2A, as shown in FIG. 2B, is stored in the ROM 32 in advance as a function of the amount of depression L of the accelerator pedal 40 and the engine speed N. In this embodiment of the present invention, the required torque TQ in accordance with the amount of depression L of the accelerator pedal 40 and the engine speed N is first calculated from the map shown in FIG. 2B, then the amount of fuel injection, etc. are calculated based on the required torque TQ.

Figure 3A:
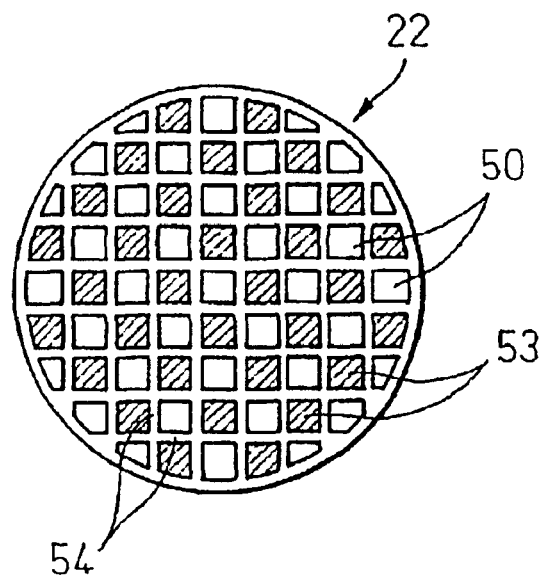
FIGS. 3A and 3B are views of a particulate filter.
Figure 3B:
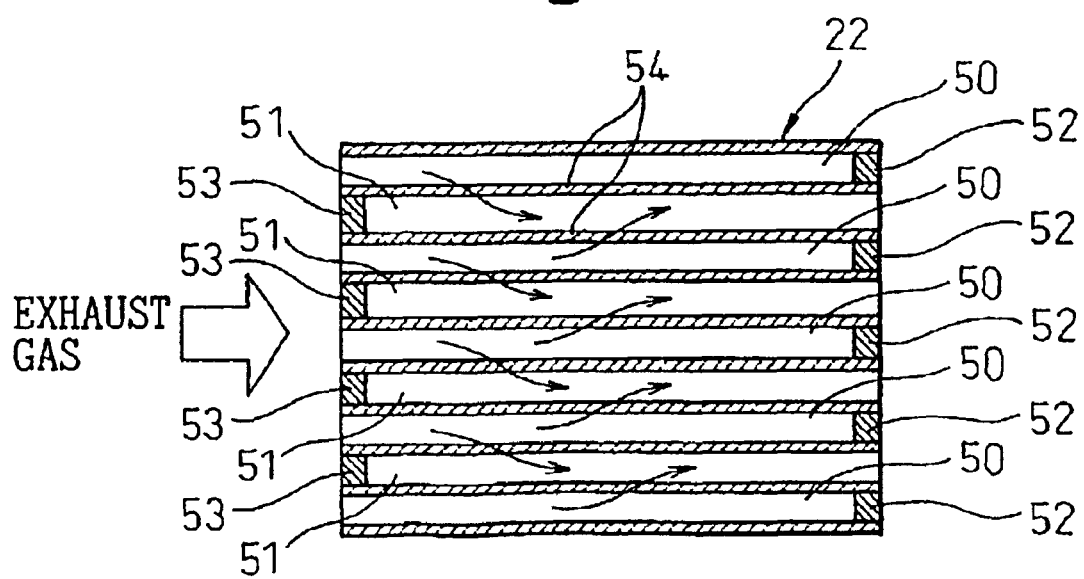

FIGS. 3A and 3B show the structure of the particulate filter 22. Note that FIG. 3A is a front view of the particulate filter 22, while FIG. 3B is a side sectional view of the particulate filter 22. As shown in FIGS. 3A and 3B, the particulate filter 22 forms a honeycomb structure and is provided with a plurality of exhaust circulation passages 50, 51 extending in parallel with each other. These exhaust circulation passages comprise exhaust gas inflow passages 50 with downstream ends sealed by plugs 52 and exhaust gas outflow passages 51 with upstream ends sealed by plugs 52. Note that the hatched portions in FIG. 3A show plugs 53. Therefore, the exhaust gas inflow passages 50 and the exhaust gas outflow passages 51 are arranged alternately through thin wall partitions 54. In other words, the exhaust gas inflow passages 50 and the exhaust gas outflow passages 51 are arranged so that each exhaust gas inflow passage 50 is surrounded by four exhaust gas outflow passages 51, and each exhaust gas outflow passage 51 is surrounded by four exhaust gas inflow passages 50.

The particulate filter 22 is formed from a porous material such as, for example, cordierite. Therefore, the exhaust gas flowing into the exhaust gas inflow passages 50 flows out into the adjoining exhaust gas outflow passages 51 through the surrounding partitions 54 as shown by the arrows in FIG. 3B.

In an embodiment of the present invention, a layer of a carrier comprised of for example alumina is formed on the peripheral surfaces of the exhaust gas inflow passages 50 and the exhaust gas outflow passages 51, that is, the two side surfaces of the partitions 54, the inside walls of the fine holes in the partitions 54 outer end faces of the plugs 53, and inner end face of the plugs 52, 53. On the carrier are carried a precious metal catalyst and an active oxygen release agent which absorbs the oxygen and holds the oxygen if excess oxygen is present in the surroundings and releases the held oxygen in the form of active oxygen if the concentration of the oxygen in the surroundings falls.

In this case, in an embodiment according to the present invention, platinum Pt is used as the precious metal catalyst. As the active oxygen release agent, use is made of at least one of an alkali metal such as potassium K, sodium Na, lithium Li, cesium Cs, and rubidium Rb, an alkali earth metal such as barium Ba, calcium Ca, and strontium Sr, a rare earth such as lanthanum La, yttrium Y, and cerium Ce, a transition metal such as iron Fe, and a carbon family element such as tin Sn.

Note that in this case, as the active oxygen release agent, use is preferably made of an alkali metal or an alkali earth metal with a higher tendency to ionization than calcium Ca, that is, potassium K, lithium Li, cesium Cs, rubidium Rb, barium Ba, and strontium Sr.

Next, the action of removal of the particulates in the exhaust gas by the particulate filter 22 will be explained by taking, as an example, the case of carrying platinum Pt and potassium K on a carrier, but the same type of action for removal of particulates is performed even when using another precious metal, alkali metal, alkali earth metal, rare earth, transition metal and carbon family element.

In a compression ignition type internal combustion engine such as shown in FIG. 1, combustion occurs under an excess of air. Therefore, the exhaust gas contains a large amount of excess air. That is, if the ratio of the air and fuel fed into the intake passage, combustion chamber 5, and exhaust passage is called the air-fuel ratio of the exhaust gas, then in a compression ignition type internal combustion engine such as shown in FIG. 1, the air-fuel ratio of the exhaust gas becomes lean. Further, in the combustion chamber 5, NO is generated, so the exhaust gas contains NO. Further, the fuel contains sulfur S. This sulfur S reacts with the oxygen in the combustion chamber 5 to become $SO_2$. Therefore, the exhaust gas contains $SO_2$. Accordingly, exhaust gas containing excess oxygen, $NO_x$ and $SO_2$ flows into the exhaust gas inflow passages 50 of the particulate filter 22.

Figure 4A:
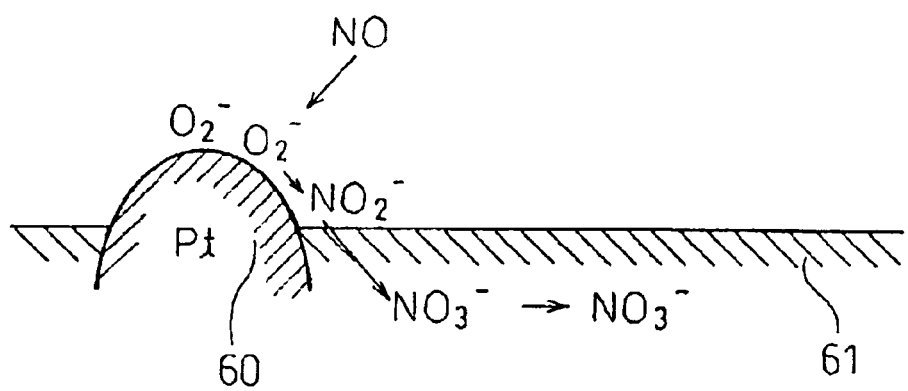
FIGS. 4A and 4B are views for explaining an action of oxidation of particulates.
Figure 4B:
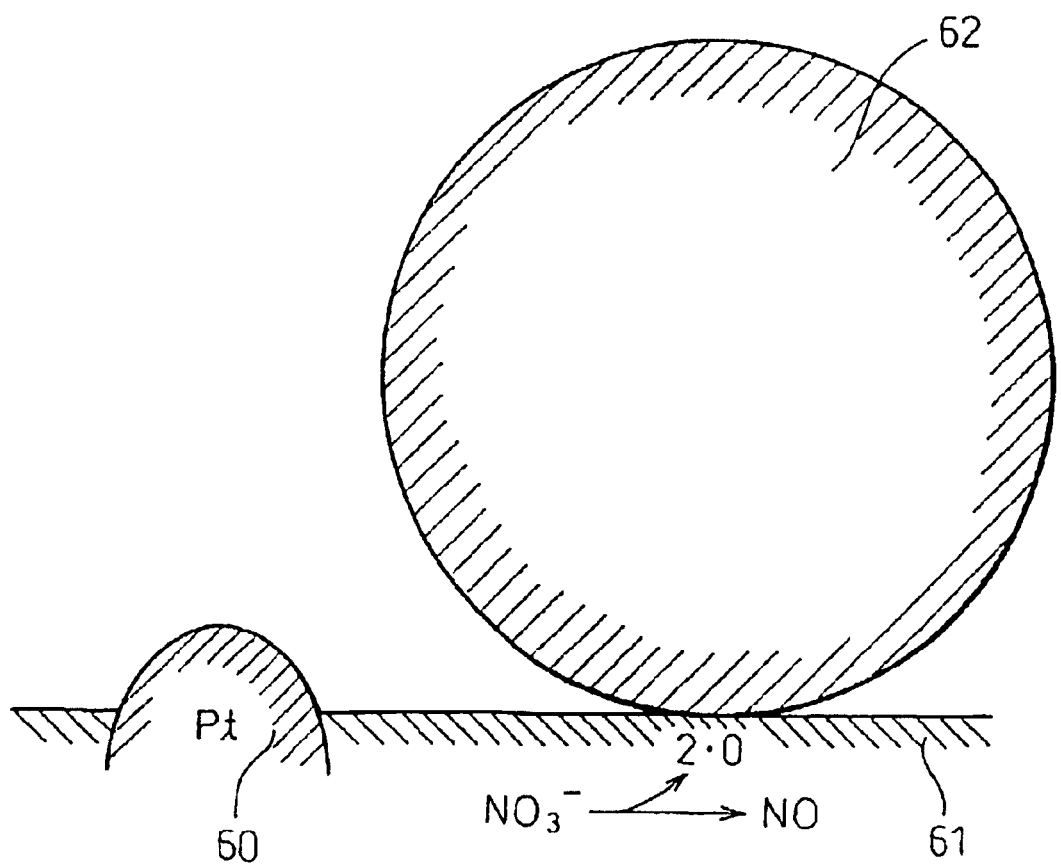

FIGS. 4A and 4B are enlarged views of the surface of the carrier layer formed on the inner circumferential surfaces of the exhaust gas inflow passages 50 and the inside walls of the fine holes in the partitions 54. Note that in FIGS. 4A and 4B, 60 indicates particles of platinum Pt, while 61 indicates the active oxygen release agent containing potassium K.

In this way, since a large amount of excess oxygen is contained in the exhaust gas, if the exhaust gas flows into the exhaust gas inflow passages 50 of the particulate filter 22, as shown in FIG. 4A, the oxygen $O_2$ adheres to the surface of the platinum Pt in the form of $O_2^-$ or $O^{2-}$. On the other hand, the NO in the exhaust gas reacts with the $O_2^-$ or $O^{2-}$ on the surface of the platinum Pt to become $NO_2$ ($2NO + O_2 \rightarrow 2NO_2$). Next, part of the $NO_2$ which is produced is absorbed in the active oxygen release agent 61 while being oxidized on the platinum Pt and diffuses in the active oxygen release agent 61 in the form of nitrate ions $NO_3^-$ as shown in FIG. 4A. Part of the nitrate ions $NO_3^-$ produces potassium nitrate $KNO_3$.

On the other hand, as explained above, the exhaust gas also contains $SO_2$. This $SO_2$ is absorbed in the active oxygen release agent 61 by a mechanism similar to that of NO. That is, in the above way, the oxygen $O_2$ adheres to the surface of the platinum Pt in the form of $O_2^-$ or $O^{2-}$. The $SO_2$ in the exhaust gas reacts with the $O_{2-}$ or $O_2^-$ on the surface of the platinum Pt to become $SO_3$. Next, part of the $SO_3$ which is produced is absorbed in the active oxygen release agent 61 while being oxidized on the platinum Pt and diffuses in the active oxygen release agent 61 in the form of sulfate ions $SO_4^{2-}$ while bonding with the potassium K to produce potassium sulfate $K_2SO_4$. In this way, potassium sulfate $KNO_3$ and potassium sulfate $K_2SO_4$ are produced in the active oxygen release agent 61.

On the other hand, particulates comprised of mainly carbon are produced in the combustion chamber 5. Therefore, the exhaust gas contains these particulates. The particulates contained in the exhaust gas contact and adhere to the surface of the carrier layer, for example, the surface of the active oxygen release agent 61, as shown in FIG. 4B, when the exhaust gas is flowing through the exhaust gas inflow passages 50 of the particulate filter 22 or when moving from the exhaust gas inflow passages 50 to the exhaust gas outflow passages 51.

If the particulate 62 adheres to the surface of the active oxygen release agent 61 in this way, the concentration of oxygen at the contact surface of the particulate 62 and the active oxygen release agent 61 falls. If the concentration of oxygen falls, a difference in concentration occurs with the inside of the high oxygen concentration active oxygen release agent 61 and therefore the oxygen in the active oxygen release agent 61 moves toward the contact surface between the particulate 62 and the active oxygen release agent 61. As a result, the potassium nitrate $KNO_3$ formed in the active oxygen release agent 61 is broken down into potassium K, oxygen O, and NO. The oxygen O moves toward the contact surface between the particulate 62 and the active oxygen release agent 61, while the NO is released from the active oxygen release agent 61 to the outside. The NO released to the outside is oxidized on the downstream side platinum Pt and is again absorbed in the active oxygen release agent 61.

On the other hand, if the temperature of the particulate filter 22 is high at this time, the potassium sulfate $K_2SO_4$ formed in the active oxygen release agent 61 is also broken down into potassium K, oxygen O, and $SO_2$. The oxygen O moves toward the contact surface between the particulate 62 and the active oxygen release agent 61, while the $SO_2$ is released from the active oxygen release agent 61 to the outside. The $SO_2$ released to the outside is oxidized on the downstream side platinum Pt and again absorbed in the active oxygen release agent 61. Note that, since the potassium sulfate $K_2SO_4$ is stable and hard to break down, the potassium sulfate $K_2SO_4$ releases the active oxygen less than does the potassium nitrate $KNO_3$.

Further, as explained above, the active oxygen release agent 61 produces and releases the active oxygen during the reaction with the oxygen when the active oxygen release agent 61 absorbs $NO_x$ in the form of nitrate ions $NO_3^-$. Similarly, the active oxygen release agent 61 produces and releases the active oxygen during the reaction with the oxygen when the active oxygen release agent 61 absorbs $SO_2$ in the form of sulfate ions $SO_4^{2-}$.

On the other hand, the oxygen O moving toward the contact surface between the particulate 62 and the active oxygen release agent 61 is the oxygen broken down from compounds such as potassium nitrate $KNO_3$ or potassium sulfate $K_2SO_4$. The oxygen O broken down from these compounds has a high energy and has an extremely high activity. Therefore, the oxygen moving toward the contact surface between the particulate 62 and the active oxygen release agent 61 becomes active oxygen O. Similarly, oxygen produced during the reaction of $NO_x$ or $SO_2$ with oxygen in the active oxygen release agent 61 becomes active oxygen O. If this active oxygen O contacts the particulate 62, the oxidation action of the particulate 62 is promoted and the particulate 62 is oxidized without emitting a luminous flame for a short period of several seconds to several tens of minutes and is completely removed. While the particulate 62 is being oxidized in this way, other particulate are successively depositing on the particulate filter 22. Therefore, in practice, a certain amount of particulates is always depositing on the particulate filter 22. Part of the deposited particulates are removed by oxidation. In this way, the particulates 62 deposited on the particulate filter 22 are continuously burned without emitting luminous flame.

Note that the $NO_x$ is considered to diffuse in the active oxygen release agent 61 in the form of nitrate ions $NO_3^-$ while repeatedly bonding with and separating from the oxygen atoms. Active oxygen is produced during this time as well. The particulates 62 are also oxidized by this active oxygen. Further, the particulate 62 deposited on the particulate filter 22 is oxidized by the active oxygen O, but the particulate 62 is also oxidized by the oxygen in the exhaust gas.

Further, note that the active oxygen release agent 61 is a material for oxidizing the particulates.

When the particulates deposited in layers on the particulate filter 22 are burned, the particulate filter 22 becomes red hot and burns with a flame. This burning with a flame does not continue unless the temperature is high. Therefore, to continue burning with a flame, the temperature of the particulate filter 22 must be maintained high.

As opposed to this, in the present invention, the particulates 62 are oxidized without emitting a luminous flame as explained above. At this time, the surface of the particulate filter 22 does not become red hot. That is, in other words, in the present invention, the particulates 62 are removed by oxidation at a considerably low temperature. Accordingly, the action of removal of the particulates 62 by oxidation without emitting a luminous flame according to the present invention is completely different from the action of removal of particulates by burning accompanied with a flame.

The platinum Pt and the active oxygen release agent 61 become more active the higher the temperature of the particulate filter 22, so the amount of the active oxygen O which can be released by the active oxygen release agent 61 per unit time increases the higher the temperature of the particulate filter 22. Further, naturally, the particulates are more easily removed, by oxidation, the higher the temperature of the particulates itself. Therefore, the amount of the particulates removable by oxidation per unit time, without emitting a luminous flame on the particulate filter 22, increases the higher the temperature of the particulate filter 22.

The solid line in FIG. 6 shows the amount G of the particulates removable by oxidation per unit time without emitting a luminous flame. The abscissa of FIG. 6 shows the temperature TF of the particulate filter 22. Note that FIG. 6 shows the amount G of particulates removable by oxidation in the case where the unit time is 1 second, that is, per second, but 1 minute, 10 minutes, or any other time may also be employed as the unit time. For example, when using 10 minutes as the unit time, the amount G of particulates removable by oxidation per unit time expresses the amount G of particulates removable by oxidation per 10 minutes. In this case as well, the amount G of particulates removable by oxidation per unit time, without emitting a luminous flame on the particulate filter 22, as shown in FIG. 6, increases the higher the temperature of the particulate filter 22.

Now, if the amount of the particulates discharged from the combustion chamber 5 per unit time is called the amount M of discharged particulates, when the amount M of discharged particulates is smaller than the amount G of particulates removable by oxidation for the same unit time or when the amount M of discharged particulates per 10 minutes is smaller than the amount G of particulates removable by oxidation per 10 minutes, that is, in the region I of FIG. 6, all of the particulates discharged from the combustion chamber 5 and contacting the particulate filter 22 is removed by oxidation successively in a short time without emitting a luminous flame on the particulate filter 22.

Figure 5A:
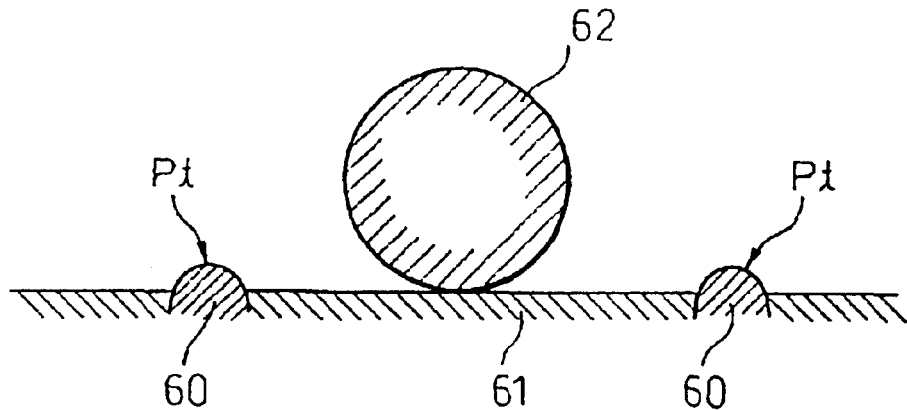
FIGS. 5A to 5C are views for explaining an action of deposition of particulates.
Figure 5B:
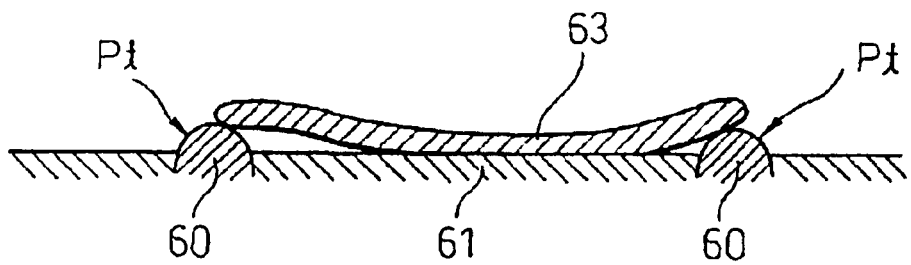
Figure 5C:
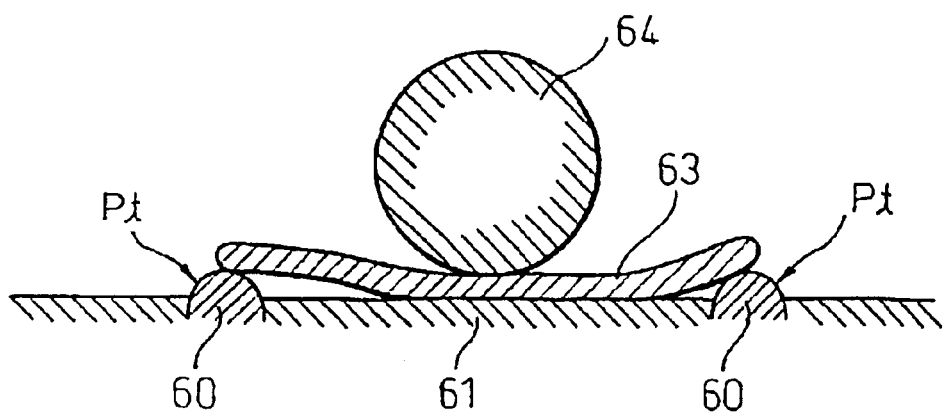

As opposed to this, when the amount M of discharged particulates is larger than the amount G of particulates removable by oxidation, that is, in the region II of FIG. 6, the amount of active oxygen is not sufficient for successive oxidation of all of the particulates. FIGS. 5A to 5C show the state of oxidation of particulates in this case.

That is, when the amount of active oxygen is not sufficient for successive oxidation of all of the particulates, if particulates 62 adhere on the active oxygen release agent 61 as shown in FIG. 5A, only some of the particulates 62 are oxidized. The portions of the particulates not sufficiently oxidized remain on the carrier layer. Next, if the state of insufficient amount of active oxygen continues, the portions of the particulates not oxidized successively remain on the carrier layer. As a result, as shown in FIG. 5B, the surface of the carrier layer is covered by the residual particulate portions 63.

This residual particulate portion 63 covering the surface of the carrier layer gradually changes to hard-to-oxidize graphite and therefore the residual particulate portion 63 easily remains as it is. Further, if the surface of the carrier layer is covered by the residual particulate portion 63, the action of oxidation of the NO and $SO_2$ by the platinum Pt and the action of release of the active oxygen from the active oxygen release agent 61 are suppressed. As a result, as shown in FIG. 5C, other particulates 64 successively deposit on the residual particulate portion 63. That is, the particulates deposit in layers. If the particulates deposit in layers in this way, the particulates are separated in distance from the platinum Pt or the active oxygen release agent 61, so even if they are easily oxidizable particulates, they will not be oxidized by active oxygen O. Therefore, other particulates successively deposit on the particulate 64. That is, if the state of the amount M of discharged particulates being larger than the amount G of particulates removable by oxidation continues, particulates deposit in layers on the particulate filter 22 and, therefore, unless the temperature of the exhaust gas is made higher or the temperature of the particulate filter 22 is made higher, it is no longer possible to cause the deposited particulates to ignite and burn.

In this way, in the region I of FIG. 6, the particulates are burned in a short time without emitting a luminous flame on the particulate filter 22. In the region II of FIG. 6, the particulates deposit in layers on the particulate filter 22. Therefore, to prevent the particulates from depositing in layers on the particulate filter 22, the amount M of discharged particulates has to be kept smaller than the amount G of the particulates removable by oxidation at all times.

As will be understood from FIG. 6, with the particulate filter 22 used in this embodiment of the present invention, the particulates can be oxidized even if the temperature TF of the particulate filter 22 is considerably low. Therefore, in a compression ignition type internal combustion engine shown in FIG. 1, it is possible to maintain the amount M of the discharged particulates and the temperature TF of the particulate filter 22 so that the amount M of discharged particulates normally becomes smaller than the amount G of the particulates removable by oxidation. Therefore, in this embodiment of the present invention, the amount M of discharged particulates and the temperature TF of the particulate filter 22 are maintained so that the amount M of discharged particulates usually becomes smaller than the amount G of the particulates removable by oxidation.

If the amount M of discharged particulates is maintained to be usually smaller than the amount G of particulates removable by oxidation in this way, the particulates no longer deposit in layers on the particulate filter 22. As a result, the pressure loss of the flow of exhaust gas in the particulate filter 22 is maintained at a substantially constant minimum pressure loss to the extent of not changing much at all. Therefore, it is possible to maintain the drop in output of the engine at a minimum.

Further, the action of removal of particulates by oxidation of the particulates takes place even at a considerably low temperature. Therefore, the temperature of the particulate filter 22 does not rise that much at all and consequently there is almost no risk of deterioration of the particulate filter 22. Further, since the particulates do not deposit in layers on the particulate filter 22, there is no danger of coagulation of ash and therefore there is less danger of the particulate filter 22 clogging.

This clogging however occurs mainly due to the calcium sulfate $CaSO_4$. That is, fuel or lubrication oil contains calcium Ca. Therefore, the exhaust gas contains calcium Ca. This calcium Ca produces calcium sulfate $CaSO_4$ in the presence of $SO_3$. This calcium sulfate $CaSO_4$ is a solid and will not break down by heat even at a high temperature. Therefore, if calcium sulfate $CaSO_4$ is produced and the fine holes of the particulate filter 22 are clogged by this calcium sulfate $CaSO_4$, clogging occurs.

In this case, however, if an alkali metal or an alkali earth metal having a higher tendency toward ionization than calcium Ca, for example potassium K, is used as the active oxygen release agent 61, the $SO_3$ diffused in the active oxygen release agent 61 bonds with the potassium K to form potassium sulfate $K_2SO_4$. The calcium Ca passes through the partitions 54 of the particulate filter 22 and flows out into the exhaust gas outflow passage 51 without bonding with the $SO_3$. Therefore, there is no longer any clogging of fine holes of the particulate filter 22. Accordingly, as described above, it is preferable to use an alkali metal or an alkali earth metal having a higher tendency toward ionization than calcium Ca, that is, potassium K, lithium Li, cesium Cs, rubidium Rb, barium Ba, and strontium Sr, as the active oxygen release agent 61.

In an embodiment of the present invention, the intention is basically to maintain the amount M of the discharged particulates smaller than the amount G of the particulates removable by oxidation in all operating states. In practice, however, it is almost impossible to keep the amount X of discharged particulates lower than the amount G of the particulates removable by oxidation in all operating states. For example, at the time of engine startup, the temperature of the particulate filter 22 is normally low. Therefore, at this time, the amount M of discharged particulates becomes larger than the amount G of the particulates removable by oxidation. Therefore, in this embodiment of the present invention, the amount M of discharged particulates is made to become smaller than the amount G of the particulates removable by oxidation normally continuously except for special cases such as right after engine startup.

Note that if the amount M of discharged particulates becomes larger than the amount G of the particulates removable by oxidation such as immediately after engine startup, the portion of the particulate which could not be oxidized on the particulate filter 22 remaining. If the amount M of discharged particulates becomes smaller than the amount G of the particulates removable by oxidation when this portion of the particulate which could not be oxidized in this way remains, that is, when the particulates only deposit less than a certain limit, the portion of the residual particulate is removed by oxidation by the active oxygen O without emitting a luminous flame. Therefore, in this embodiment of the present invention, at the time of a special operating state such as immediately after engine startup, the amount M of discharged particulates and the temperature TF of the particulate filter 22 are maintained so that only an amount of particulates, less than a certain limit which can be removed by oxidation when the amount M of discharged particulates becomes smaller than the amount G of the particulates removable by oxidation, deposits on the particulate filter 22.

Further, there are sometimes cases where the particulates deposit in layers on the particulate filter 22 due to some reason or another even if the amount M of discharged particulates and the temperature TF of the particulate filter 22 are maintained in this way. Even in this case, if the air-fuel ratio of part or all of the exhaust gas is made temporarily rich, the particulates deposited on the particulate filter 22 is oxidized without emitting a luminous flame. That is, if the air-fuel ratio of the exhaust gas is made rich, that is, if the concentration of oxygen in the exhaust gas is lowered, the active oxygen O is released all at once to the outside from the active oxygen release agent 61. The particulates deposited by the active oxygen O released all at once is removed by oxidation in a short time without emitting a luminous flame.

On the other hand, if the air-fuel ratio is maintained lean, the surface of the platinum Pt is covered by oxygen and so-called oxygen poisoning of the platinum Pt occurs. If such oxygen poisoning occurs, the action of oxidation of the $NO_x$ falls, so the efficiency of $NO_x$ absorption falls and therefore the amount of active oxygen released from the active oxygen release agent 61 falls. If the air-fuel ratio is made rich, however, the oxygen on the surface of the platinum Pt is consumed, so the oxygen poisoning is eliminated. Therefore, if the air-fuel ratio is changed from rich to lean, the action of oxidation of the $NO_x$ becomes stronger, so the efficiency of $NO_x$ absorption becomes higher and therefore the amount of release of active oxygen from the active oxygen release agent 61 increases.

Therefore, if the air-fuel ratio is sometimes switched from lean to rich when the air-fuel ratio is maintained lean, the oxygen poisoning of the platinum Pt is eliminated each time. Therefore the amount of release of active oxygen increases when the air-fuel ratio is lean and therefore the action of oxidation of the particulates on the particulate filter 22 can be promoted.

Now, in FIG. 6, the amount G of the particulates removable by oxidation is shown as a function of only the temperature TF of the particulate filter 22, but the amount G of the particulates removable by oxidation is actually a function of the concentration of oxygen in the exhaust gas, the concentration of $NO_x$ in the exhaust gas, the concentration of unburned hydrocarbons in the exhaust gas, the degree of ease of oxidation of the particulates, the spatial velocity of the flow of exhaust gas in the particulate filter 22, the pressure of the exhaust gas, etc. Therefore, the amount G of the particulates removable by oxidation is preferably calculated taking into consideration the effects of all of the above factors including the temperature TF of the particulate filter 22.

Figure 7A:
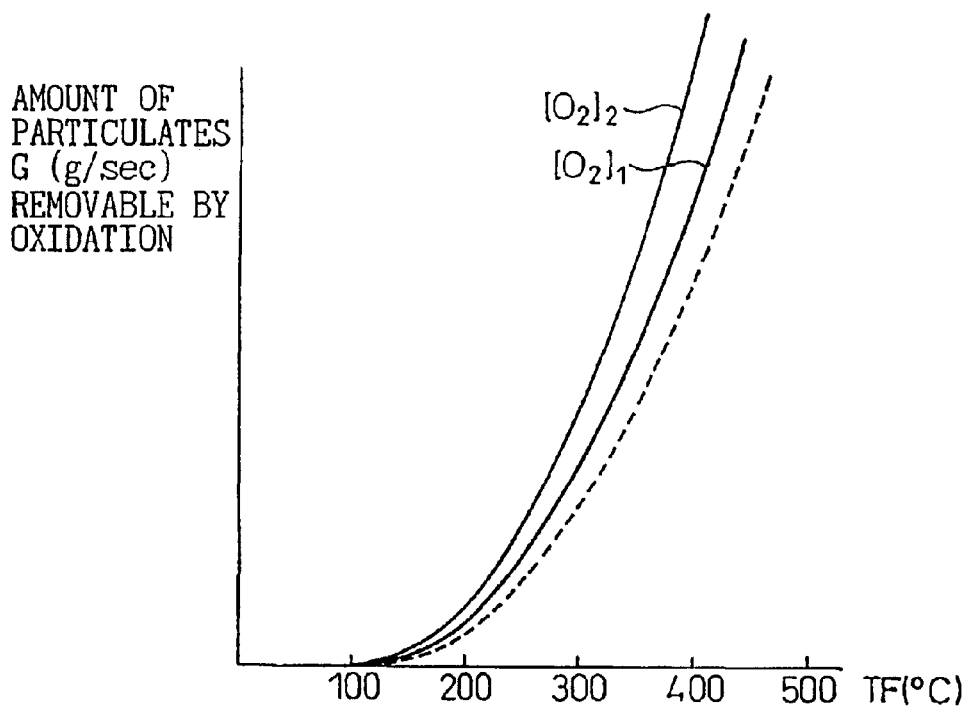
FIGS. 7A and 7B are views of an amount of particulates removable by oxidation.
Figure 7B:
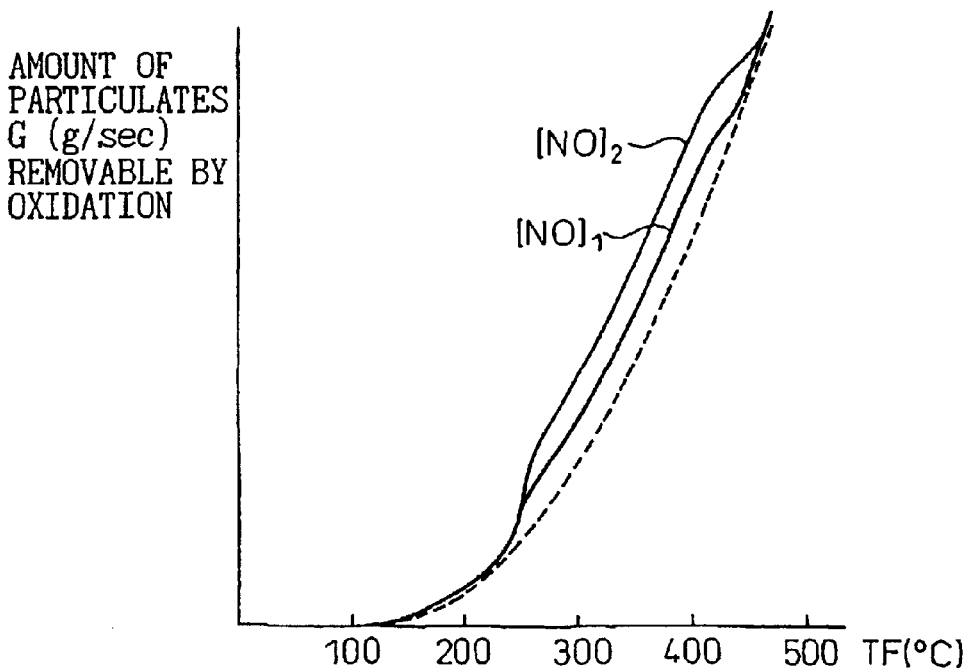
Figure 8A:
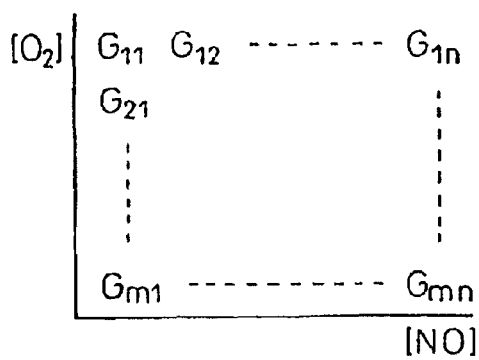
FIGS. 8A to 8F are views of maps of the amount G of particulates removable by oxidation.
Figure 8B:
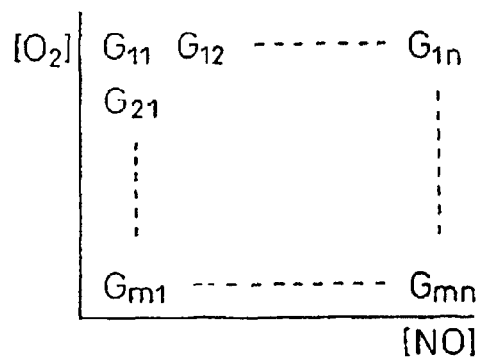
Figure 8C:
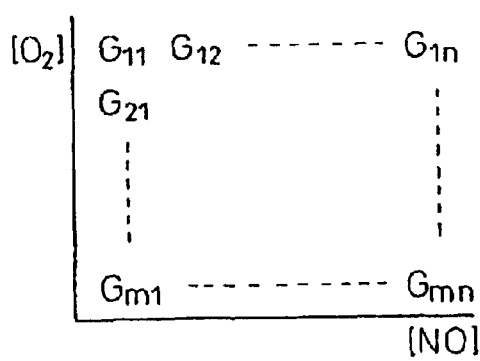
Figure 8D:
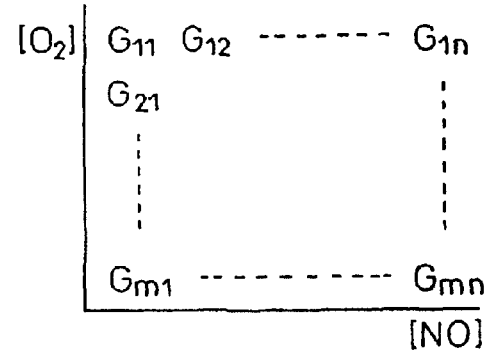
Figure 8E:
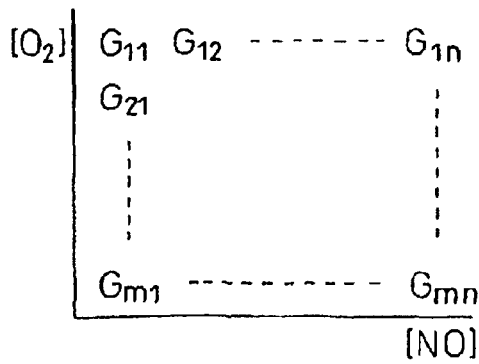
Figure 8F:
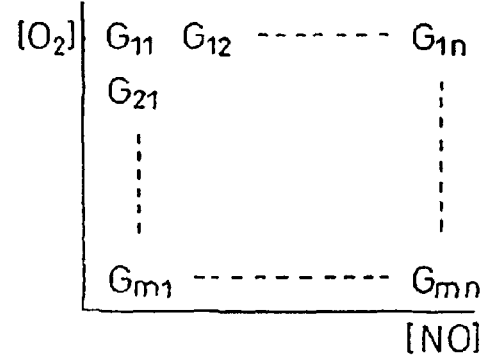

The factor having the greatest effect on the amount G of the particulates removable by oxidation among these however is the temperature TF of the particulate filter 22. Factors having relatively large effects are the concentration of oxygen in the exhaust gas and the concentration of $NO_x$. FIG. 7A shows the change of the amount G of the particulates removable by oxidation when the temperature TF of the particulate filter 22 and the concentration of oxygen in the exhaust gas change. FIG. 7B shows the change of the amount G of the particulates removable by oxidation when the temperature TF of the particulate filter 22 and the concentration of $NO_x$ in the exhaust gas change. Note that, in FIGS. 7A and 7B, the broken lines show the cases when the concentration of oxygen and the concentration of $NO_x$ in the exhaust gas are the reference values. In FIG. 7A, $[O_2]_1$ shows the case when the concentration of oxygen in the exhaust gas is higher than the reference value, while $[O_2]_2$ shows the case where the concentration of oxygen is even higher than $[O_2]_1$ In FIG. 7B, $[NO]_1$ shows the case when the concentration of $NO_x$ in the exhaust gas is higher than the reference value, while $[NO]_2$ shows the case where the concentration of $NO_x$ is even higher than $[NO]_1$.

If the concentration of oxygen in the exhaust gas becomes high, the amount G of the particulates removable by oxidation increases. Since the amount of oxygen absorbed into the active oxygen release agent 61 further increases, however, the active oxygen released from the active oxygen release agent 61 also increases. Therefore, as shown in FIG. 7A, the higher the concentration of oxygen in the exhaust gas, the more the amount G of the particulates removable by oxidation increases.

On the other hand, the NO in the exhaust gas, as explained earlier, is oxidized on the surface of the platinum Pt and becomes $NO_2$. Part of the thus produced $NO_2$ is absorbed in the active oxygen release agent 61, while the remaining $NO_2$ disassociates to the outside from the surface of the platinum Pt. At this time, if the platinum Pt contacts the $NO_2$, an oxidation reaction will be promoted. Therefore, as shown in FIG. 7B, the higher the concentration of $NO_x$ in the exhaust gas, the more the amount G of the particulates removable by oxidation increases. However, the action of promoting the oxidation of the particulates by the $NO_2$ only occurs while the temperature of the exhaust gas is from about 250° C. to about 450° C., so, as shown in FIG. 7B, if the concentration of $NO_x$ in the exhaust gas becomes higher, the amount G of the particulates removable by oxidation increases while the temperature TF of the particulate filter 22 is from about 250° C. to 450° C.

As explained above, it is preferable to calculate the amount G of the particulates removable by oxidation taking into consideration all of the factors having an effect on the amount G of the particulates removable by oxidation. In this embodiment of the present invention, however, the amount G of the particulates removable by oxidation is calculated based on only the temperature TF of the particulate filter 22 having the largest effect on the amount G of the particulates removable by oxidation among the factors and the concentration of oxygen and the concentration of $NO_x$ in the exhaust gas having relatively large effects.

That is, in this embodiment of the present invention, as shown in FIG. 8A to 8F, the amounts G of particulates removable by oxidation at various temperatures TF (200° C., 250° C., 300° C., 350° C., 400° C., and 450° C.) are stored in advance in the ROM 32 in the form of a map as a function of the concentration of oxygen $[O_2]$ in the exhaust gas and the concentration of $NO_x$ [NO] in the exhaust gas. The amount G of the particulates removable by oxidation in accordance with the temperature TF of the particulate filter 22, the concentration of oxygen $[O_2]$, and the concentration of $NO_x$ [NO] is calculated by proportional distribution from the maps shown from FIGS. 8A to 8F.

Note that the concentration of oxygen $[O_2]$ and the concentration of $NO_x$ [NO] in the exhaust gas can be detected using an oxygen concentration sensor and a $NO_x$ concentration sensor. In this embodiment of the present invention, however, the concentration of oxygen $[O_2]$ in the exhaust gas is stored in advance in the ROM 32 in the form of a map as shown in FIG. 9A as a function of the required torque TQ and engine speed N. The concentration of $NO_x$ [NO] in the exhaust gas is stored in advance in the ROM 32 in the form of a map as shown in FIG. 9B as a function of the required torque TQ and the engine speed N. The concentration of oxygen $[O_2]$ and concentration of $NO_x$ [NO] in the exhaust gas are calculated from these maps.

Figure 10A:
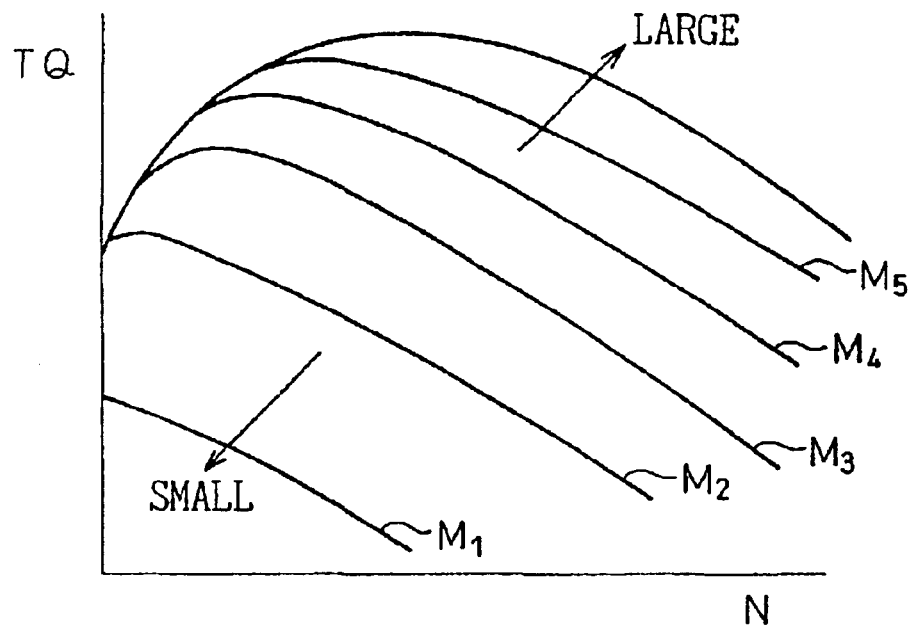
FIGS. 10A and 10B are views of the amount of discharged particulates.
Figure 10B:
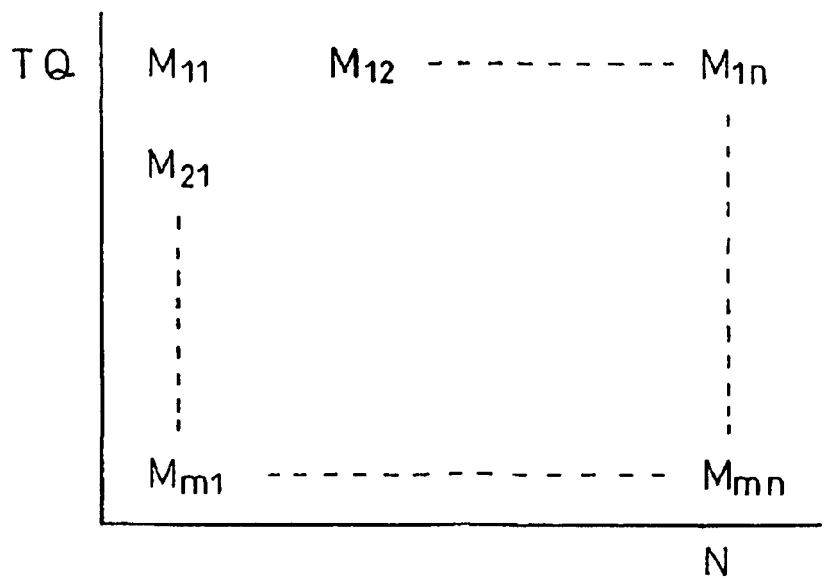

On the other hand, the amount G of the particulates removable by oxidation changes according to the type of the engine, but once the type of the engine is determined, it becomes a function of the required torque TQ and the engine speed N. FIG. 10A shows the amount M of discharged particulates of the internal combustion engine shown in FIG. 1. The curves $M_1$, $M_2$, $M_3$, $M_4$, and $M_5$ show the amounts of equivalent discharged particulates ($M_1<M_2<M_3<M_4<M_5$). In the example shown in FIG. 10A, the higher the required torque TQ, the more the amount M of discharged particulates increases. Note that the amount M of discharged particulates shown in FIG. 10A is stored in advance in the ROM 32 in the form of a map shown in FIG. 10B as a function of the required torque TQ and the engine speed N.

Now, in the embodiment according to the present invention, as explained above, a layer of a carrier comprised of aluminum is, for example, formed on the two side surfaces of the partitions 54 of the particulate filter 22 and the inside walls of the fine holes in the partitions 54. A precious metal catalyst and active oxygen release agent are carried on this carrier. Further, in this embodiment of the present invention, the carrier carries a precious metal catalyst and an $NO_x$ absorbent which absorbs the $NO_x$ contained in the exhaust gas when the air-fuel ratio of the exhaust gas flowing into the particulate filter 22 is lean and releases the absorbed $NO_x$ when the air-fuel ratio of the exhaust gas flowing into the particulate filter 22 becomes the stoichiometric air-fuel ratio or rich.

In this embodiment according to the present invention, platinum Pt is used as the precious metal catalyst. As the $NO_x$ absorbent, use is made of at least one of an alkali metal such as potassium K, sodium Na, lithium Li, cesium Cs, and rubidium Rb, an alkali earth metal such as barium Ba, calcium Ca, and strontium Sr, and a rare earth such as lanthanum La and yttrium Y. Note that, as will be understood by a comparison with the metal comprising the above active oxygen release agent, the metal comprising the $NO_x$ absorbent and the metal comprising the active oxygen release agent match, in large part.

In this case, it is possible to use different metals or to use the same metal as the $NO_x$ absorbent and the active oxygen release agent. When using the same metal as the $NO_x$ absorbent and the active oxygen release agent, the function as a $NO_x$ absorbent and the function of an active oxygen release agent are simultaneously exhibited.

Next, an explanation will be given of the action of absorption and release of $NO_x$ taking, as an example, the case of use of platinum Pt as the precious metal catalyst and use of potassium K as the $NO_x$ absorbent.

First, considering the action of absorption of $NO_x$, the $NO_x$ is absorbed in the $NO_x$ absorbent by the same mechanism as the mechanism shown in FIG. 4A. However, in this case, in FIG. 4A, reference numeral 61 indicates the $NO_x$ absorbent.

When the air-fuel ratio of the exhaust gas flowing into the particulate filter 22 is lean, since a large amount of excess oxygen is contained in the exhaust gas, if the exhaust gas flows into the exhaust gas inflow passages 50 of the particulate filter 22, as shown in FIG. 4A, the oxygen $O_2$ adheres to the surface of the platinum Pt in the form of $O_2^-$ or $O^{2-}$. On the other hand, the NO in the exhaust gas reacts with the $O_2^-$ or $O^{2-}$ on the surface of the platinum Pt to become $NO_2$ ($2NO+O_2\rightarrow 2NO_2$). Next, part of the $NO_2$ which is produced is absorbed in the $NO_x$ absorbent 61 while being oxidized on the platinum Pt and diffuses in the $NO_x$ absorbent 61 in the form of nitrate ions $NO_3^-$ as shown in FIG. 4A while bonding with the potassium K. Some of the nitrate ions $NO_3^-$ produce potassium nitrate $KNO_3$. In this way, NO is absorbed in the $NO_x$ absorbent 61.

On the other hand, when the exhaust gas flowing into the particulate filter 22 becomes rich, the nitrate ions $NO_3^-$ are broken down into oxygen O and NO and then NO is successively released from the $NO_x$ absorbent 61. Therefore, when the air-fuel ratio of the exhaust gas flowing into the particulate filter 22 becomes rich, the NO is released from the $NO_x$ absorbent 61 in a short time. Further, the released NO is reduced, so no NO is discharged into the atmosphere.

Note that in this case, even if the air-fuel ratio of the exhaust gas flowing into the particulate filter 22 is the stoichiometric air-fuel ratio, NO is released from the $NO_x$ absorbent 61. In this case, however, since the NO is only released gradually from the $NO_x$ absorbent 61, it takes a somewhat long time for all of the $NO_x$ absorbed in the $NO_x$ absorbent 61 to be released.

As explained above, however, it is possible to use different metals for the $NO_x$ absorbent and the active oxygen release agent. In this embodiment of the present invention, however, the same metal is used for the $NO_x$ absorbent and the active oxygen release agent. In this case, as explained earlier, the function of the $NO_x$ absorbent and the function of the active oxygen release agent are performed simultaneously. An agent which performs these two functions simultaneously will be called an active oxygen release agent/$NO_x$ absorbent from here on. Therefore, in this embodiment of the present invention, reference numeral 61 in FIG. 4A shows an active oxygen release agent/$NO_x$ absorbent.

When using such an active oxygen release agent/$NO_x$ absorbent, when the air-fuel ratio of the exhaust gas flowing into the particulate filter 22 is lean, the NO contained in the exhaust gas is absorbed in the active oxygen release agent/ $NO_x$ absorbent 71. If the particulates contained in the exhaust gas adhere to the active oxygen release agent/$NO_x$ absorbent 61, the particulates are removed by oxidation in a short time by the active oxygen contained in the exhaust gas and the active oxygen released from the active oxygen release agent/$NO_x$ absorbent 61. Therefore, at this time, it is possible to prevent the discharge of both the particulates and the $NO_x$ in the exhaust gas into the atmosphere.

On the other hand, when the air-fuel ratio of the exhaust gas flowing into the particulate filter 22 becomes rich, NO is released from the active oxygen release agent/$NO_x$ absorbent 61. This NO is reduced by the unburned hydrocarbons and CO and therefore no NO is discharged into the atmosphere at this time as well. Further, the particulates deposited on the particulate filter 22 are removed by oxidation by the active oxygen released from the active oxygen release agent/$NO_x$ absorbent 61.

As already explained with reference to FIG. 6, the action of release of active oxygen from the active oxygen release agent 61 is started from when the temperature of the particulate filter 22 is considerably low. The same is true even when using the active oxygen release agent/$NO_x$ absorbent 61. As opposed to this, the action of absorption of $NO_x$ in the active oxygen release agent/$NO_x$ absorbent 61 does not start unless the temperature TF of the particulate filter 22 becomes higher than the temperature of start of release of active oxygen. This is considered to be because the release of active oxygen is caused if oxygen is robbed from the potassium nitrate $KNO_3$ for example, while the action of absorption of $NO_x$ is not started unless the platinum Pt is activated.

FIG. 11 shows the amount G of the particulates removable by oxidation and the $NO_x$ absorption rate when using potassium K as the active oxygen release agent/$NO_x$ absorbent 61. From FIG. 11, it is learned that the action of release of active oxygen is started when the temperature TF of the particulate filter 22 is less than 200° C., while the action of absorption of $NO_x$ is not started unless the temperature TF of the particulate filter 22 is over 200° C.

On the other hand, the action of release of active oxygen becomes more active the higher the temperature TF of the particulate filter 22. As opposed to this, the action of absorption of $NO_x$ disappears when the temperature TF of the particulate filter 22 becomes higher. That is, if the temperature TF of the particulate filter 22 exceeds a certain temperature, in the example shown in FIG. 11, about 500° C., the nitrate ions $NO_3^-$ or potassium nitrate $KNO_3$ break down under heat and NO is released from the active oxygen release agent/$NO_x$ absorbent 61. In this state, the amount of release of NO becomes greater than the amount of absorption of $NO_x$ and therefore, as shown in FIG. 11, the $NO_x$ absorption rate falls.

FIG. 11 shows the $NO_x$ absorption rate when using potassium K as the $NO_x$ absorbent or the active oxygen release agent/$NO_x$ absorbent 61. In this case, the temperature range of the particulate filter 22 where the $NO_x$ absorption rate becomes higher differs by the metal used. For example, when using barium Ba as the $NO_x$ absorbent or the active oxygen release agent/$NO_x$ absorbent 61, the temperature range of the particulate filter 22 where the $NO_x$ absorption rate becomes higher becomes narrower than the case of use of potassium K shown in FIG. 11.

As explained above, however, to enable the particulates in the exhaust gas to be removed by oxidation without depositing in layers on the particulate filter 22, it is necessary to make the amount M of discharged particulates smaller than the amount G of the particulates removable by oxidation. If just making the amount M of discharged particulates smaller than the amount G of the particulates removable by oxidation, however, the action of absorption of $NO_x$ by the $NO_x$ absorbent or the active oxygen release agent/$NO_x$ absorbent 61 does not occur. To ensure the action of absorption of $NO_x$ by the $NO_x$ absorbent or the active oxygen release agent/$NO_x$ absorbent, it is necessary to maintain the temperature TF of the particulate filter 22 within the temperature range where the action of absorption of $NO_x$ occurs. In this case, the temperature range of the particulate filter 22 where the $NO_x$ absorption action occurs has to be made a temperature range where the $NO_x$ absorption rate becomes more than a certain value, for example, more than 50 percent. Therefore, when using potassium K as the $NO_x$ absorbent or the active oxygen release agent/$NO_x$ absorbent 61, as will be understood from FIG. 11, the temperature TF of the particulate filter 22 has to be maintained between about 250° C. to 500° C.

Therefore, in this embodiment of the present invention, to remove by oxidation the particulates in the exhaust gas without they depositing in layers on the particulate filter 22 and to absorb the $NO_x$ in the exhaust gas, the amount M of discharged particulates is maintained smaller than the amount G of the particulates removable by oxidation continuously and temperature TF of the particulate filter 22 is maintained in the temperature range where the $NO_x$ absorption rate of the particulate filter 22 becomes more than a certain value. That is, the amount X of discharged particulates and the temperature TF of the particulate filter 22 are kept in the simultaneous particulates and $NO_x$ treatment region shown by the hatching in FIG. 11.

Even if the amount M of discharged particulates and the temperature of the particulate filter 22 are maintained in the simultaneously particulate and $NO_x$ treatment region in this way, sometimes the amount M of discharged particulates and the temperature of the particulate filter 22 will move outside the simultaneous particulate and $NO_x$ treatment region. In this case, in this embodiment of the present invention, at least one of the amount M of discharged particulates, amount G of the particulates removable by oxidation, and temperature TF of the particulate filter 22 is controlled so that the amount M of discharged particulates and the temperature of the particulate filter 22 move inside the simultaneous particulate and $NO_x$ treatment region. This will be explained next with reference to FIG. 12.

First, the case when the amount M of discharged particulates and the temperature of the particulate filter 22 reach the point A outside the simultaneous particulate and $NO_x$ treatment region shown in FIG. 12, that is, the amount M of discharged particulates becomes larger than the amount G of the particulates removable by oxidation and the temperature TF of the particulate filter 22 becomes lower than the lower limit temperature of the simultaneous particulate and $NO_x$ treatment region, will be explained. In this case, as shown by the arrow, by raising the temperature TF of the particulate filter 22, the amount M of discharged particulates and the temperature TF of the particulate filter 22 are returned to within the simultaneous particulate and $NO_x$ treatment region.

Next, the case where the amount M of discharged particulates and the temperature TF of the particulate filter 22 reach the point B outside the simultaneous particulate and $NO_x$ treatment region shown in FIG. 12, that is, where the amount M of discharged particulates becomes greater than the amount G of the particulates removable by oxidation and the temperature TF of the particulate filter 22 is inside the temperature range of the simultaneous particulate and $NO_x$ treatment region will be explained. In this case, as shown by the arrow, the amount M of discharged particulates is reduced to return the amount M of discharged particulates and the temperature TF of the particulate filter 22 to the simultaneous particulate and $NO_x$ treatment region.

Next, the case where the amount M of discharged particulates and the temperature TF of the particulate filter 22 reach the point C outside the simultaneous particulate and $NO_x$ treatment region shown in FIG. 12, that is, where the amount M of discharged particulates becomes larger than the amount G of the particulates removable by oxidation and the temperature TF of the particulate filter 22 becomes higher than the upper limit temperature of the simultaneous particulate and $NO_x$ treatment region, will be explained. In this case, as shown by the arrow, the amount M of discharged particulates is reduced and the temperature TF of the particulate filter 22 is reduced so as to return the amount M of discharged particulates and the temperature TF of the particulate filter 22 to the simultaneous particulate and $NO_x$ treatment region.

In this way, by reducing the amount M of discharged particulates or raising or reducing the temperature TF of the particulate filter 22 when the amount X of discharged particulates and the temperature of the particulate filter 22 become outside the simultaneous particulates and $NO_x$ treatment region, the amount M of discharged particulate and the temperature of the particulate filter 22 are returned inside the simultaneous particulate and $NO_x$ treatment region. Note that, as another method, it is also possible to return the amount M of discharged particulates and the temperature of the particulate filter 22 to the inside of the simultaneous particulate and $NO_x$ treatment region by increasing the amount G of the particulates removable by oxidation. Therefore, next, an explanation will be given of the method of reducing the amount M of discharged particulates, the method of raising or lowering the temperature TF of the particulate filter 22, and the method of increasing the amount G of the particulates removable by oxidation.

Next, an explanation will be given of the method of using low temperature combustion to control the amount M of discharged particulates and the temperature TF of the particulate filter 22.

In the engine shown in FIG. 1, if the EGR rate (amount of EGR gas/(amount of EGR gas+amount of intake air)) is increased, the amount of smoke generated gradually increases and peaks. If the EGR rate is further raised, the amount of generation of smoke then rapidly falls. This will be explained with reference to FIG. 13 showing the relation between the EGR rate and the smoke when changing the degree of cooling of the EGR gas. Note that, in FIG. 13, the curve A shows the case of forced cooling of the EGR gas to maintain the temperature of the EGR gas at about 90° C., curve B shows the case of cooling the EGR gas by a small sized cooling device, and curve C shows the case of not force cooling the EGR gas.

As shown by curve A of FIG. 13, when force cooling the EGR gas, the amount of generation of smoke peaks when the EGR rate is slightly lower than 50 percent. In this case, if the EGR rate is made more than about 55 percent, almost no smoke is generated any longer. On the other hand, as shown by curve B of FIG. 13, when slightly cooling the EGR gas, the amount of generation of smoke peaks when the EGR rate becomes slightly higher than 50 percent. In this case, if the EGR rate is made more than about 65 percent, almost no smoke is generated any longer. Further, as shown by curve C in FIG. 13, when the EGR gas is not force cooled, the amount of generation of smoke peaks near an EGR rate of 55 percent. In this case, almost no smoke is generated any longer when the EGR rate is over about 70 percent.

The reason why smoke is no longer generated when the EGR gas rate is made over 55 percent is that due to the heat absorbing action of the EGR gas, the gas temperature of the fuel and its surroundings at the time of combustion does not become that high, that is, low temperature combustion is performed, and as a result the hydrocarbon does not grow into soot.

This low temperature combustion has the characteristic of enabling suppression of the generation of smoke and reduction of the amount of generation of $NO_x$ regardless of the air-fuel ratio. That is, when the air-fuel ratio is made rich, the fuel becomes excessive, but since the combustion temperature is suppressed to a low temperature, the excess fuel does not grow to soot and therefore no smoke is generated. Further, at this time, only an extremely small amount of $NO_x$ is produced. On the other hand, when the mean air-fuel ratio is lean or the air-fuel ratio is the stoichiometric air-fuel ratio, if the combustion temperature becomes high, a small amount of soot is produced, but under low temperature combustion, the combustion temperature is suppressed to a low temperature, so no smoke is generated at all and only an extremely small amount of $NO_x$ is generated.

On the other hand, if low temperature combustion is performed, the gas temperature of the fuel and its surroundings becomes low, but the temperature of the exhaust gas rises. This will be explained with reference to FIGS. 14A and 14B.

Figure 14A:
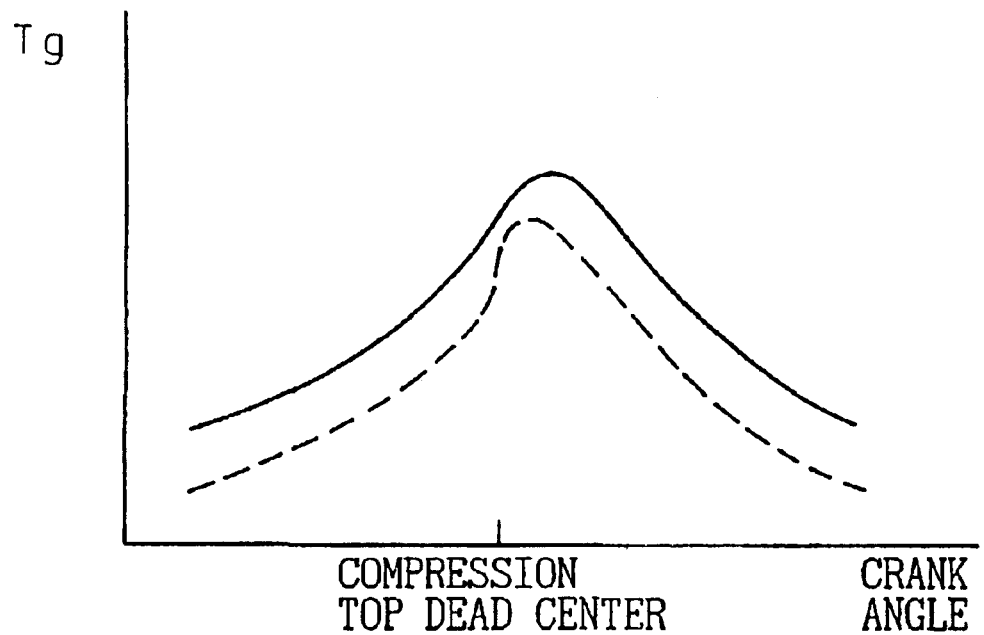
FIGS. 14A and 14B are views of the temperature of gas in the combustion chamber.
Figure 14B:
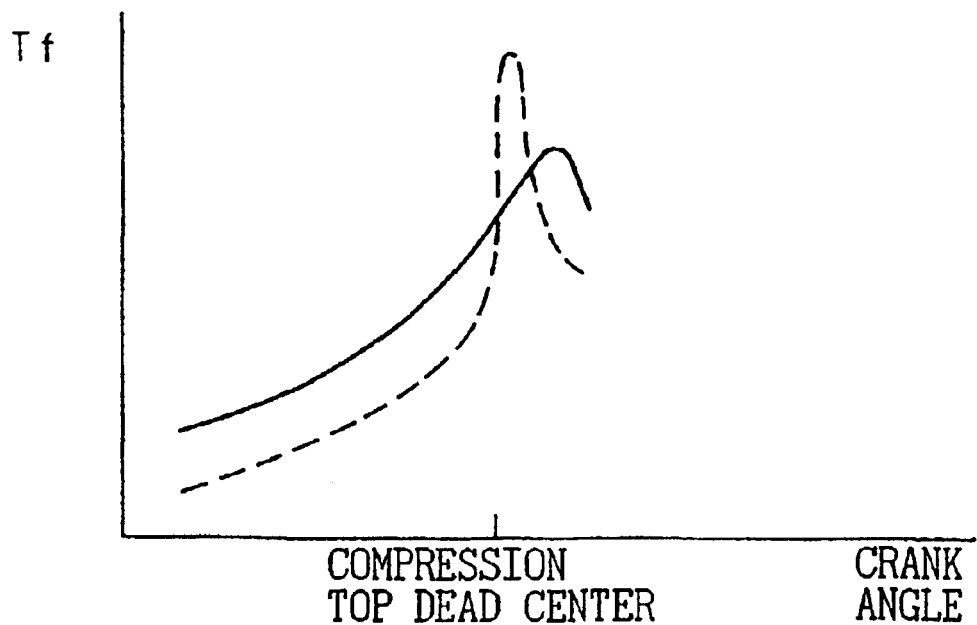

The solid line of FIG. 14A shows the relationship between the mean gas temperature Tg in the combustion chamber 5 and the crank angle when low temperature combustion is performed, while the broken line of FIG. 14A shows the relationship between the mean gas temperature Tg in the combustion chamber 5 and the crank angle when normal combustion is performed. Further, the solid line of FIG. 14B shows the relationship between the gas temperature of the fuel and its surroundings when low temperature combustion is performed, while the broken line of FIG. 14B shows the relationship between the gas temperature Tf of the fuel and its surroundings and the crank angle when normal combustion is performed.

When low temperature combustion is performed, the amount of EGR gas becomes larger than when normal combustion is performed. Therefore, as shown in FIG. 14A, before top dead center of the compression stroke, that is, during the compression stroke, the mean gas temperature Tg at the time of low temperature combustion shown by the solid line becomes higher than the mean gas temperature Tg at the time of normal combustion shown by the broken line. Note that at this time, as shown in FIG. 14B, the gas temperature Tf of the fuel and its surroundings becomes about the same temperature as the mean gas temperature Tg.

Next, the combustion starts near top dead center of the compression stroke. In this case, at the time of low temperature combustion, as shown by the solid line of FIG. 14B, due to the heat absorbing action of the EGR gas, the gas temperature Tf of the fuel and its surroundings does not become that high. As opposed to this, at the time of normal combustion, there is a large amount of oxygen around the fuel, as shown by the broken line of FIG. 14B, the gas temperature Tf of the fuel and its surroundings becomes extremely high. When normal combustion is performed in this way, the gas temperature Tf of the fuel and its surroundings becomes considerably high compared with the case of low temperature combustion, but the temperature of the gas other than the majority becomes lower when normal combustion is performed compared with when low temperature combustion is performed. Therefore, as shown in FIG. 14A, the mean gas temperature Tg in the combustion chamber 5 near top dead center of the compression stroke becomes higher at the time of low temperature combustion compared with normal combustion. As a result, as shown in FIG. 14A, the temperature of the already burned gas in the combustion chamber 5 after the combustion is finished becomes higher at the time of low temperature combustion compared with normal combustion. Therefore, at the time of low temperature combustion, the temperature of the exhaust gas becomes high.

If low temperature combustion is performed in this way, the amount of generation of smoke, that is, the amount M of discharged particulate, becomes smaller and the temperature of the exhaust gas rises. Therefore, when switching from normal combustion to low temperature combustion during engine operation, the amount M of discharged particulate can be reduced and the temperature TF of the particulate filter 22 can be raised. AS opposed to this, when switching from low temperature combustion to normal combustion, the temperature TF of the particulate filter 22 falls. At this time, however, the amount M of discharged particulates increases. Whatever the case, by switching between normal combustion and low temperature combustion, the amount M of discharged particulates and the temperature of the particulate filter 22 can be controlled.

Figure 15:
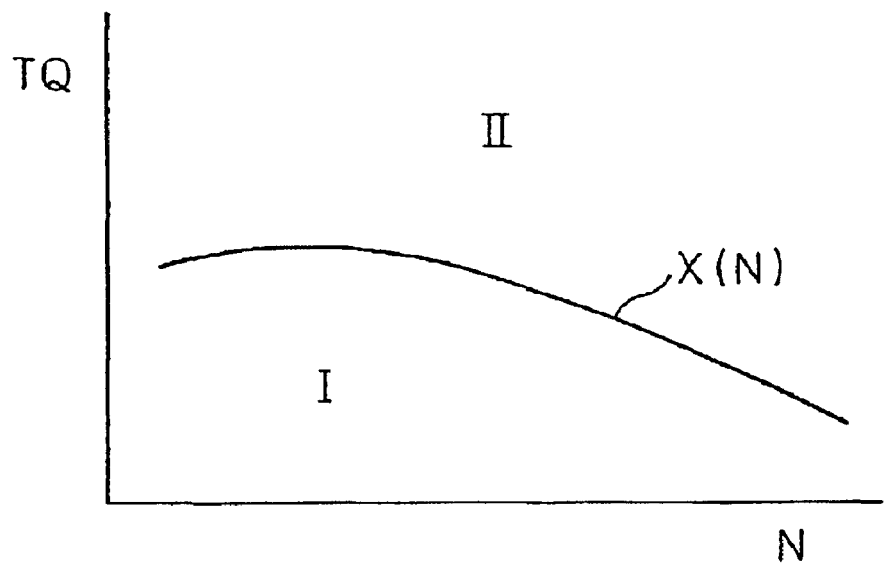
FIG. 15 is a view of operating regions I and II.

If the required torque TQ of the engine becomes higher, however, that is, if the amount of fuel injection becomes greater, the gas temperature of the fuel and its surroundings at the time of combustion becomes higher, so low temperature combustion becomes difficult. That is, low temperature combustion becomes possible only at the time of engine medium and low load operation where the amount of generation of heat by the combustion is relatively small. In FIG. 15, region I shows the operating region where first combustion where there is a larger amount of inert gas in the combustion chamber 5 than the amount of inert gas where the generation of soot peaks, that is, low temperature combustion, can be performed, while region II shows the operating region where second combustion where there is a smaller amount of inert gas in the combustion chamber 5 than the amount of inert gas where the generation of soot peaks, that is, normal temperature combustion, can be performed.

Figure 16:
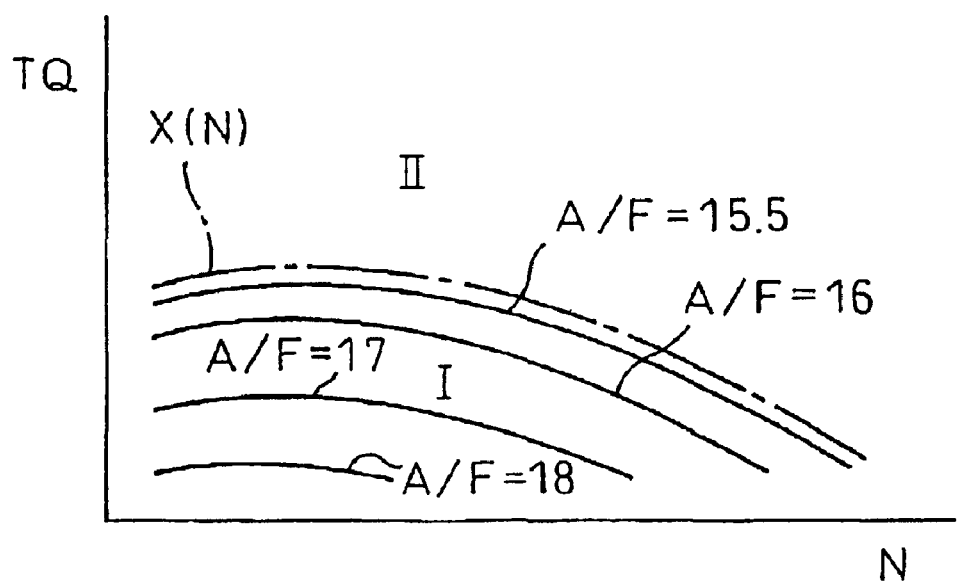
FIG. 16 is a view of an air-fuel ratio A/F.
Figure 17:
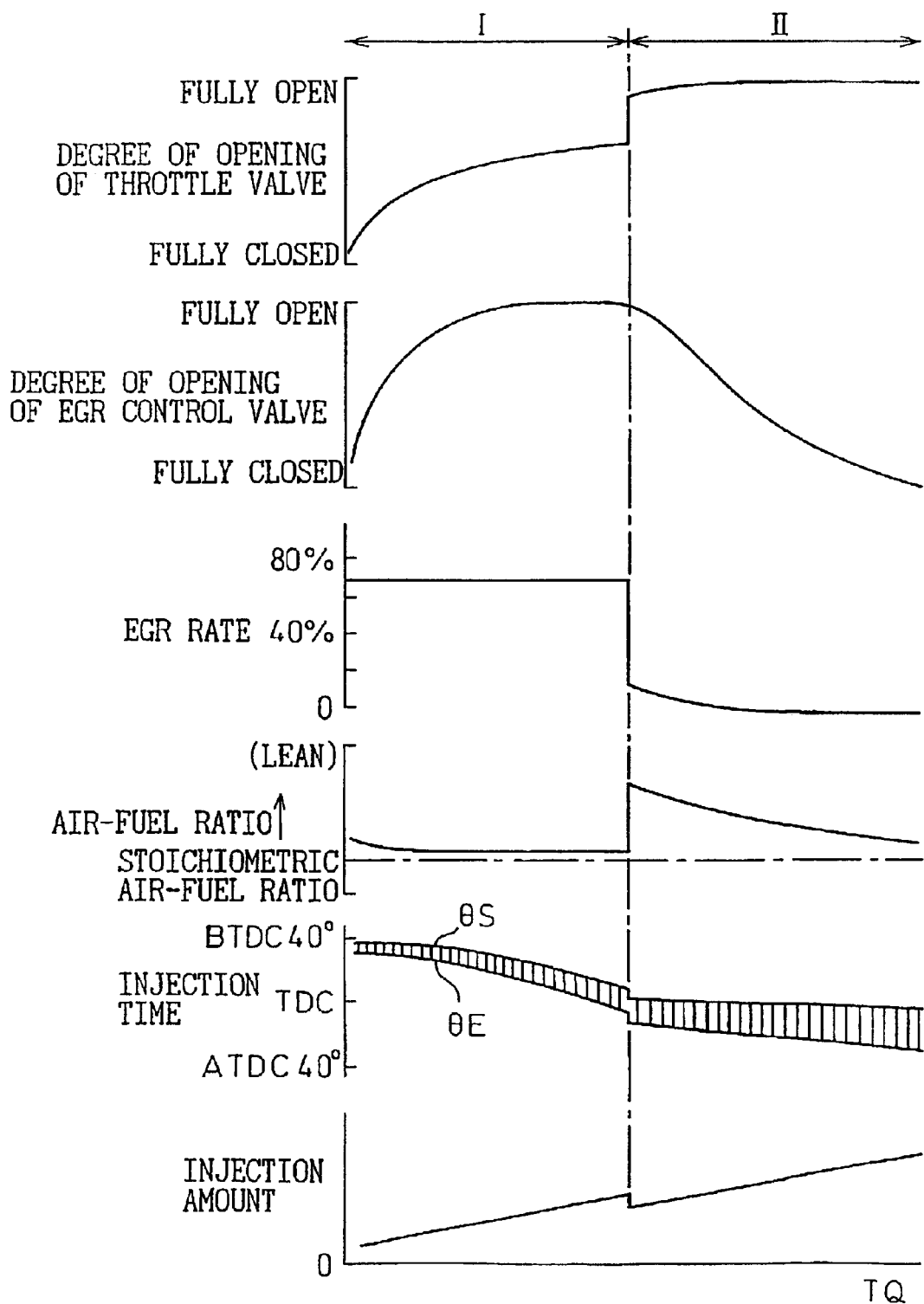
FIG. 17 is a view of a change of an opening degree of a throttle valve etc.

FIG. 16 shows the target air-fuel ratio A/F in the case of low temperature combustion in the operating region I, while FIG. 17 shows the opening degree of the throttle valve 17, the opening degree of the EGR control valve 25, the EGR rate, the air-fuel ratio, the injection start timing θS, the injection end timing θE, and the amount of injection in accordance with the required torque TQ at the time of low temperature combustion in operating region I. Note that FIG. 17 also shows the opening degree of the throttle valve 17 at the time of normal combustion performed in operating region II.

From FIG. 16 and FIG. 17, it is understood that when low temperature combustion is performed in operating region I, the EGR rate is made over 55 percent and the air-fuel ratio A/F is made a lean air-fuel ratio of 15.5 to about 18. Note that as explained above, when low temperature combustion is performed in operating region I, even if the air-fuel ratio is made rich, almost no smoke is produced.

Next, an explanation will be given of the method for increasing the concentration of oxygen in the exhaust gas for increasing the amount G of the particulates removable by oxidation. If the concentration of oxygen in the exhaust gas increases, the amount of oxygen absorbed in the active oxygen release agent 61 increases, so the amount of active oxygen released from the active oxygen release agent 61 increases and therefore the amount G of the particulates removable by oxidation increases.

As a method for executing this method, the method of controlling the EGR rate may be mentioned. That is, when the amount G of the particulates removable by oxidation is to be increased, the opening degree of the EGR control valve 25 is reduced so that the EGR rate falls. The fall in the EGR rate means that the ratio of the amount of intake air in the intake air increases. Therefore, if the EGR rate falls, the concentration of oxygen in the exhaust gas rises. As a result, the amount M of discharged particulates increases. Further, if the EGR rate falls, as mentioned above, the amount M of discharged particulates falls. Therefore, if the EGR rate falls, the amount M of discharged particulates rapidly becomes smaller than the amount G of the particulates removable by oxidation.

Now, as explained above, when the air-fuel ratio of the exhaust gas is lean, the $NO_x$ in the exhaust gas is absorbed in the active oxygen release agent/$NO_x$ absorbent 61. However, there are limits to the $NO_x$ absorption capability of the $NO_x$ absorbent 61. It is necessary to cause the release of $NO_x$ from the active oxygen release agent/$NO_x$ absorbent 61 before the $NO_x$ absorption capability of the active oxygen release agent/$NO_x$ absorbent 61 becomes saturated. Therefore, it is necessary to estimate the amount of $NO_x$ absorbed in the active oxygen release agent/$NO_x$ absorbent 61. Therefore, in this embodiment of the present invention, the $NO_x$ absorption amount A per unit time is set, in advance, in the form of a map shown in FIG. 18 as a function of the required torque TQ and engine speed N. By cumulatively adding the $NO_x$ absorption amount A per unit time, the $NO_x$ amount ΣNOX absorbed in the active oxygen release agent/$NO_x$ absorbent 61 may be estimated.

Further, in this embodiment of the present invention, when the $NO_x$ absorption amount ΣNOX exceeds a predetermined allowable maximum value MAXN, the air-fuel ratio of the exhaust gas flowing into the active oxygen release agent/$NO_x$ absorbent 61 is made temporarily rich. Due to this, $NO_x$ is made to be released from the active oxygen release agent/$NO_x$ absorbent 61.

The exhaust gas, however, contains $SO_x$. The active oxygen release agent/$NO_x$ absorbent 61 absorbs not only the $NO_x$, but also the $SO_x$. The mechanism of absorption of $SO_x$ in the active oxygen release agent/$NO_x$ absorbent 61 is the same as the mechanism of absorption of the $NO_x$.

That is, explaining this taking as an example the case of carrying platinum Pt and potassium K on the carrier in the same way as explained with respect to the mechanism of absorption of $NO_x$, as explained above, the oxygen $O_2$ adheres to the surface of the platinum Pt in the form of $O_2^-$ or $O^{2-}$ when the air-fuel ratio of the exhaust gas is lean. The $SO_2$ in the exhaust gas reacts with the $O_2^-$ or $O^{2-}$ on the surface of the platinum Pt to become $SO_3$. Next, part of the $SO_3$ which is produced is absorbed in the active oxygen release agent 61 while being oxidized on the platinum Pt and diffuses in the active oxygen release agent/$NO_x$ absorbent 61 in the form of sulfate ions $SO_4^{2-}$ while bonding with the potassium Pt to produce potassium sulfate $K_2SO_4$.

This sulfate, $K_2SO_4$, is stable and hard to break down. As explained above, even if the air-fuel ratio of the exhaust gas is made rich for releasing the $NO_x$ from the active oxygen release agent/$NO_x$ absorbent 61, the sulfate $K_2SO_4$ remains as it is without breaking down. Therefore, the sulfate $K_2SO_4$ increases in the active oxygen release agent/$NO_x$ absorbent 61 with time. Accordingly, the amount of $NO_x$ which the active oxygen release agent/$NO_x$ absorbent 61 can absorb falls with time.

The sulfate $K_2SO_4$ breaks down when the temperature of the active oxygen release agent/$NO_x$ absorbent 61 exceeds a certain temperature determined by the active oxygen release agent/$NO_x$ absorbent 61, for example, about 600° C. At this time, if the air-fuel ratio of the exhaust gas flowing into the active oxygen release agent/$NO_x$ absorbent 61 is made rich, the $SO_x$ is released from the active oxygen release agent/$NO_x$ absorbent 61. Release of the $SO_x$ from the active oxygen release agent/$NO_x$ absorbent 61, however, takes a considerably long time compared with release of $NO_x$ from the active oxygen release agent/$NO_x$ absorbent 61.

Therefore, in this embodiment of the present invention, when $SO_x$ is to be released from the active oxygen release agent/$NO_x$ absorbent 61, the temperature of the active oxygen release agent/$NO_x$ absorbent 61 is raised to about 600° C. while maintaining the state where the air-fuel ratio is lean and the amount M of discharged particulates is smaller than the amount G of the particulates removable by oxidation, then $SO_x$ is made to be released from the active oxygen release agent/$NO_x$ absorbent 61 while the air-fuel ratio of the exhaust gas flowing to the active oxygen release agent/$NO_x$ absorbent 61 is alternately switched between rich and lean.

Further, when the temperature TF of the active oxygen release agent/$NO_x$ absorbent 61 is raised to about 600° C., the state is maintained where the air-fuel ratio is lean and the amount M of discharged particulates is smaller than the amount G of the particulates removable by oxidation. Therefore, at this time, even if the particulates deposit on the particulate filter 22, the deposited particulates are removed by oxidation while the temperature TF of the active oxygen release agent/$NO_x$ absorbent 61 is raised to about 600° C.

On the other hand, there are various methods for making the air-fuel ratio of the exhaust gas flowing into the active oxygen release agent/$NO_x$ absorbent 61 rich to release the $NO_x$ or $SO_x$ from the active oxygen release agent/$NO_x$ absorbent 61. For example, when performing low temperature combustion, by making the air-fuel ratio in the combustion chamber 5 rich during low temperature combustion, it is possible to make the air-fuel ratio of the exhaust gas flowing into the active oxygen release agent/$NO_x$ absorbent 61 rich.

Further, as explained above, when the air-fuel ratio of the exhaust gas is made rich, the active oxygen is released all at once from the active oxygen release agent/$NO_x$ absorbent 61. Due to this, the particulates deposited on the particulate filter 22 are rapidly oxidized. Even after this, however, if the air-fuel ratio of the exhaust gas continues to be made rich, oxygen is not stored in the active oxygen release agent/$NO_x$ absorbent 61. Further, there is almost no oxygen present in the exhaust gas. Therefore, the particulates are deposited in layers on the particulate filter 22 without being oxidized.

Therefore, in this embodiment of the present invention, when releasing $SO_x$, which requires that the air-fuel ratio be made rich for a long period, the air-fuel ratio of the exhaust gas flowing into the active oxygen release agent/$NO_x$ absorbent 61 is alternately switched between rich and lean as explained above. By doing this, when the air-fuel ratio of the exhaust gas becomes lean, the particulates on the particulate filter 22 are removed by oxidation by the active oxygen in the exhaust gas or the active oxygen released from the active oxygen release agent/$NO_x$ absorbent 61. Therefore, it is possible to prevent the particulates from depositing in layers on the particulate filter 22.

Next, an explanation will be made, with reference to FIG. 26, of the processing routine of the $NO_x$ releasing flag set when the $NO_x$ is to be released from the active oxygen release agent/$NO_x$ absorbent 61 and the $SO_x$ releasing flag set when the $SO_x$ is to be released from the active oxygen release agent/$NO_x$ absorbent 61. Note that this routine is executed by interruption every certain time interval.

Figure 19:
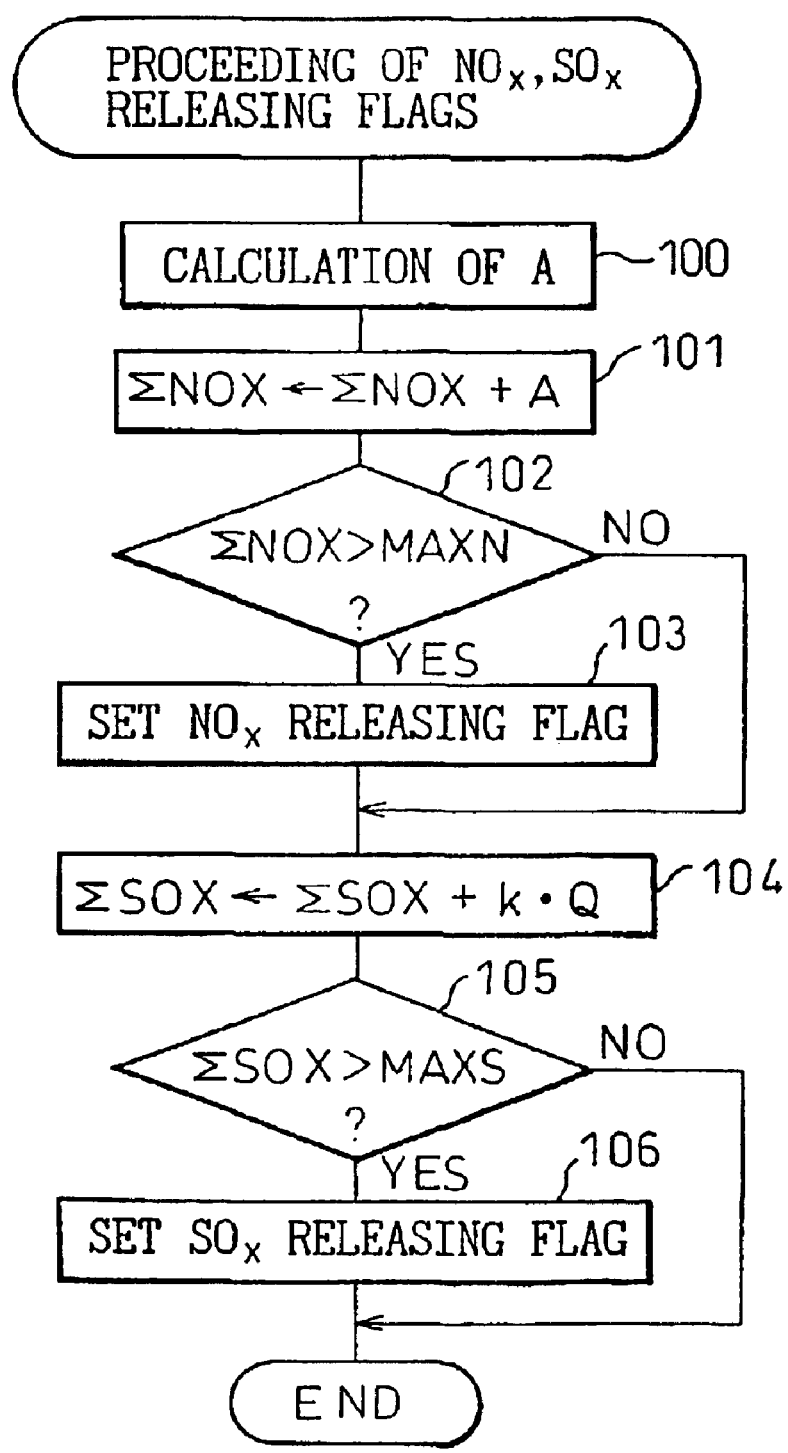
FIG. 19 is a flow chart for processing a $NO_x$ releasing flag and $SO_x$ releasing flag.

With reference to FIG. 19, first, at step 100, the $NO_x$ absorption amount A per unit time is calculated from the map shown in FIG. 18. Next, at step 101, A is added to the $NO_x$ absorption amount $\Sigma NOX$. Next, at step 102, it is decided if the $NO_x$ absorption amount $\Sigma NOX$ has exceeded the allowable maximum value MAXN. When $\Sigma NOX > MAXN$, the routine proceeds to step 103, the $NO_x$ releasing flag showing that the $NO_x$ is to be released is set. Next, the routine proceeds to step 104.

At step 104, the product k Q of the constant k multiplied with the injection amount Q is added to $\Sigma SOX$. The fuel contains a certain amount of sulfur S. Therefore, the amount of $SO_x$ absorbed in the active oxygen release agent/$NO_x$ absorbent 61 can be expressed by k Q. Therefore, the $\Sigma SOX$ obtained by successively adding k Q expresses the amount of $SO_x$ estimated to be absorbed in the active oxygen release agent/$NO_x$ absorbent 61. At step 105, it is decided if the $SO_x$ amount $\Sigma SOX$ is over the allowable maximum MAXs. When $\Sigma SOX > MAXS$, the routine proceeds to step 106, where the $SO_x$ releasing flag is set.

Next, an explanation will be made of the control of the operation while referring to FIG. 27 and FIG. 28.

Figure 20:
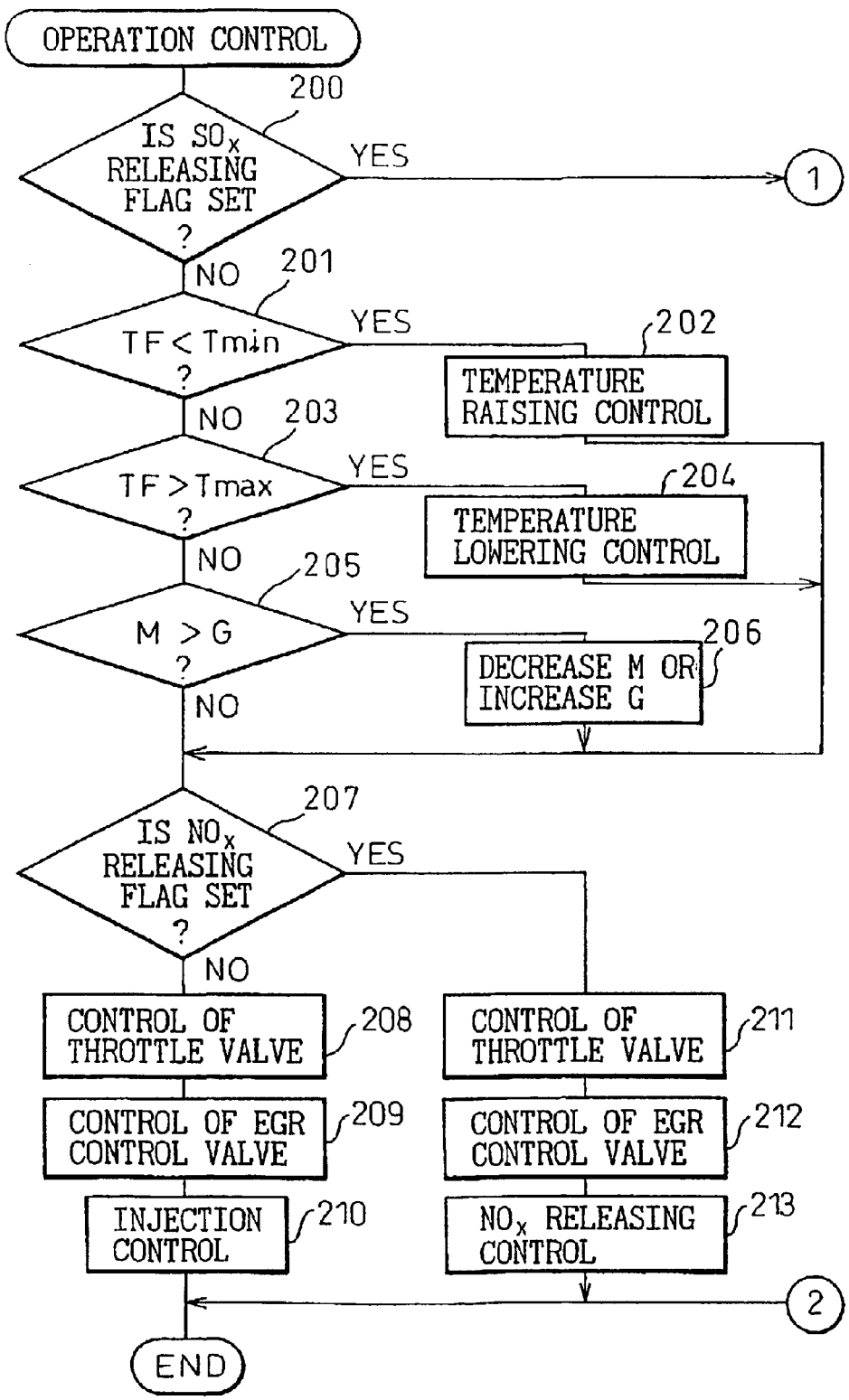
FIGS. 20 and 21 are flow charts for control of engine operation.
Figure 21:
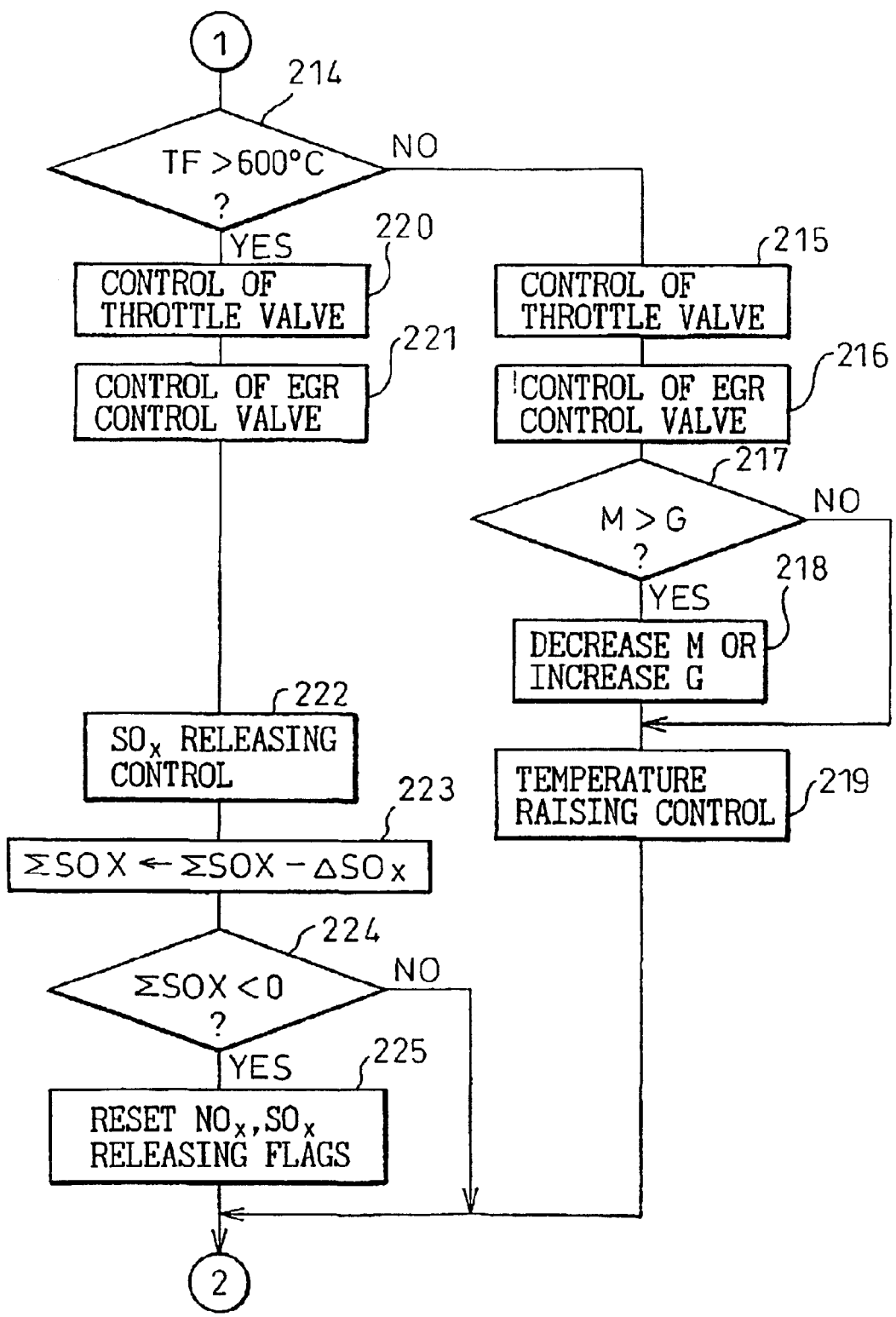

Referring to FIG. 20 and FIG. 21, first, at step 200, it is decided if the $SO_x$ releasing flag is set. When the $SO_x$ releasing flag is not set, the routine proceeds to step 201, where it is decided if the temperature TF of the particulate filter 22 is lower than the lower limit temperature $T_{min}$ of the simultaneous particulate and $NO_x$ treatment region shown by the hatching in FIG. 11, for example, 250° C. When $TF < T_{min}$, the routine proceeds to step 202, where one of the methods for raising the temperature TF of the particulate filter 22 is executed. Next, the routine proceeds to step 207.

On the other hand, when it is decided at step 201 that $TF \geq T_{min}$, the routine proceeds to step 203, where it is decided if the temperature TF of the particulate filter 22 is higher than the upper limit temperature $T_{max}$ of the simultaneous particulate and $NO_x$ treatment region shown by the hatching in FIG. 11, for example 500° C. When $TF > T_{max}$, the routine proceeds to step 204, where one of the methods for reducing the temperature TF of the particulate filter 22 is executed. Next, the routine proceeds to step 207.

On the other hand, when it is decided at step 203 that $TF \leq T_{max}$, the routine proceeds to step 205, where it is decided if the amount M of discharged particulates is larger than amount G of the particulates removable by oxidation. When M>G, the routine proceeds to step 206, where one of the methods for reducing the amount M of discharged particulate or one of the methods for increasing the amount G of the particulates removable by oxidation is executed. Next, the routine proceeds to step 207.

On the other hand, when it is decided at step 205 that M≦G, the routine proceeds to step 207. At step 207, it is decided if the $NO_x$ flag has been set. When the $NO_x$ releasing flag has been set, the routine proceeds to step 208, where the opening degree of the throttle valve 17 is controlled, then at step 209, the opening degree of the EGR control valve 25 is controlled. Next, at step 210, the fuel injection is controlled.

As opposed to this, when it is judged at step 207 that the $NO_x$ releasing flag has been set, the routine proceeds to step 211, where the opening degree of the throttle valve 17 is controlled. Next, at step 212, the opening degree of the EGR control valve 25 is controlled. Next, at step 213, one of the methods for making the air-fuel ratio of the exhaust gas temporarily rich is executed to release the $NO_x$ and the $NO_x$ releasing flag is reset.

On the other hand, when it is decided at step 200 that the $SO_x$ releasing flag has been set, the routine proceeds to step 214, where it is decided if the temperature TF of the particulate filter 22 is more than the temperature where $SO_x$ can be released, for example, 600° C. When TF≦600° C., the routine proceeds to step 215, the opening degree of the throttle valve 17 is controlled, then at step 216, the opening degree of the EGR control valve 25 is controlled.

Next, at step 217, it is decided if the amount M of discharged particulates is larger than the amount G of the particulates removable by oxidation. When M>G, the routine proceeds to step 218, where one of the methods for reducing the amount M of discharged particulates or one of the methods for increasing the amount G of the particulates removable by oxidation is executed. Next, at step 219, one of the methods for raising the temperature TF of the particulate filter 22 to about 600° C. is executed.

On the other hand, when it is decided at step 214 that TF>600° C., the routine proceeds to step 220, where the opening degree of the throttle valve 17 is controlled and then, at step 221, the opening degree of the EGR control valve 25 is controlled. Next, at step 222, by alternately switching the air-fuel ratio of the exhaust gas between rich and lean, the release of $SO_x$ is controlled to release the $SO_x$ from the active oxygen release agent/$NO_x$ absorbent 61.

Next, at step 223, the $SO_x$ release amount $\Delta SO_x$ is subtracted from the $SO_x$ amount $\Sigma SOX$. This $SO_x$ release amount $\Delta SO_x$ may be made a certain value or may be changed in accordance with the engine operating state. Next, at step 224, it is decided if the $SO_x$ amount $\Sigma SOX$ has become negative. When $\Sigma SOX<0$, the routine proceeds to step 225, where the $NO_x$ releasing flag and the $SO_x$ releasing flag are reset.

Generally speaking, however, in an internal combustion engine, at the time of engine low load operation, the temperature of the exhaust gas is low. Therefore, sometimes it is difficult to make the amount G of the particulates removable by oxidation larger than the amount M of discharged particulates. If low temperature combustion is performed as mentioned above, however, the amount M of discharged particulates is extremely small. Further, since the temperature of the exhaust gas is high, the temperature TF of the particulate filter 22 becomes high. Therefore, even during engine low load operation, it is possible to easily increase the amount M of discharged particulates from the amount M of discharged particulates. Therefore, low temperature combustion can be said to be extremely suited to the exhaust gas purification apparatus of the present invention.

As explained above, however, this low temperature combustion is only performed in the low side operating region I shown in FIG. 15 and is not performed in the high load side operating region II. Therefore, even when performing low temperature combustion, low temperature combustion is performed only when the engine operating state is in the operating region I of FIG. 15. When the engine operating state exceeds the boundary X(N) and shifts to the operating region II, low temperature combustion is switched to normal combustion. That is, temperature combustion is performed in operating region I, while normal combustion is performed in operating region II.

Referring to FIGS. 22–25, an explanation will be given of a bypass mechanism of this embodiment. The exhaust pipe 20a is connected to an exhaust flow change pipe 80. The exhaust flow change pipe 80 has three openings. These openings are connected to a first exhaust branch pipe 81a, a second exhaust branch pipe 81b, and an exhaust pipe 82, respectively.

That is, in the exhaust flow change pipe 80, the first and second exhaust branch pipes 81a, 81b of the pair branch from the exhaust pipe 20a. The first exhaust branch pipe 81a is connected to one end of the particulate filter 22. On the other hand, the second exhaust branch pipe 81b is connected to the other end of the particulate filter 22. That is, the first and second exhaust branch pipes 81a, 81b are connected to each other to make a loop-shaped exhaust passage.

The particulate filter 22 is arranged in the loop-shaped exhaust passage. Below, for the sake of convenience in the explanation, the end of the particulate filter 22 connected to the first exhaust branch pipe 81a is referred to as a first end, and the end of the particulate filter 22 connected to the second exhaust branch pipe 81b is referred to as a second end.

A switching valve 80a is arranged in the exhaust flow change pipe 80. By changing the rotation position of the switching valve 80a, the in flowing manner of the exhaust gas is changed between the in flowing manner of the exhaust gas into the first end of the particulate filter 22 through the first exhaust branch pipe 81a, the in flowing manner of the exhaust gas into the second end of the particulate filter 22 through the second exhaust branch pipe 81b, and the inflowing manner of the exhaust gas directly into the exhaust pipe 82 without passing through the particulate filter 22.

Figure 22:
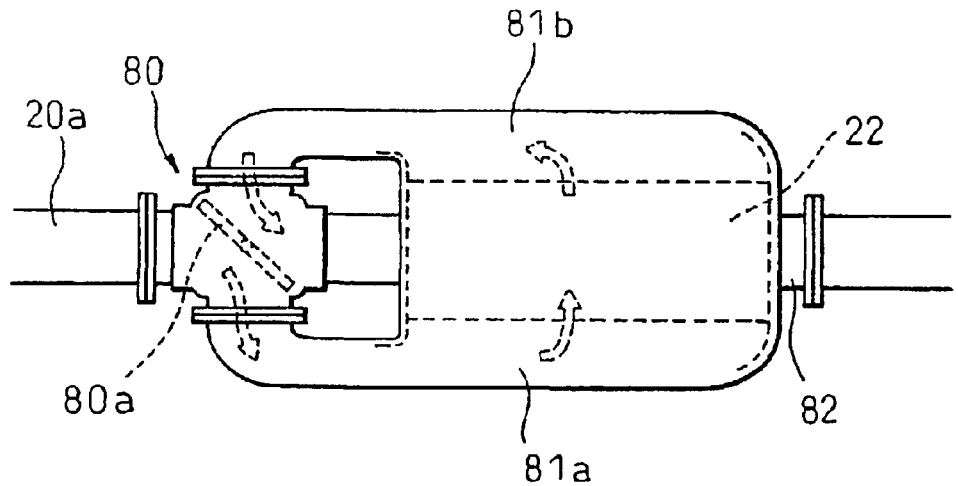
FIG. 22 is a plan view of a bypass mechanism wherein a rotation position of a switching valve is set at a first rotation position.
Figure 23:
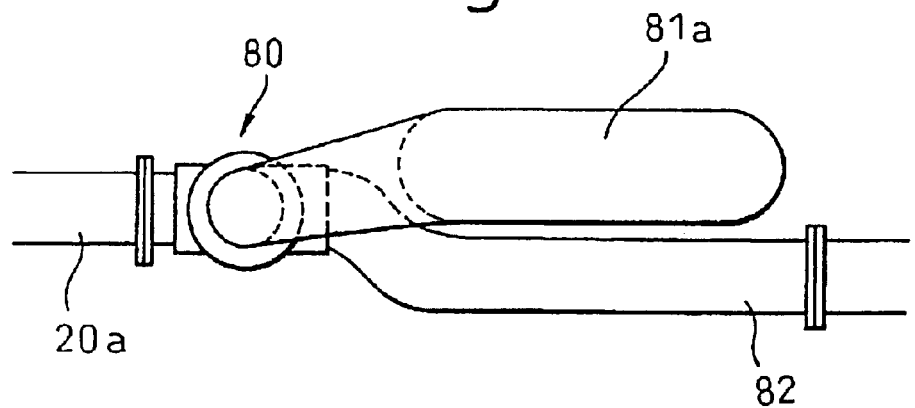
FIG. 23 is a side view of the bypass mechanism shown in FIG. 21.

When the switching valve 80a is positioned at a first rotation position as shown in FIG. 22, the exhaust gas upstream of the exhaust flow change pipe 80 flows into the particulate filter 22 at the first end thereof through the first exhaust branch pipe 81a as shown by an arrow of FIG. 22. The exhaust gas flowing into the particulate filter 22 at the first end thereof flows out from the particulate filter 22 at the second end thereof to the exhaust pipe 82 downstream of the exhaust flow change pipe 80 through the second exhaust branch pipe 81b.

Figure 24:
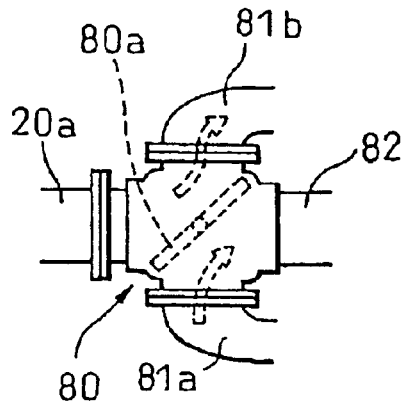
FIG. 24 is a plan view of a bypass mechanism wherein the rotation position of the switching valve is set at a second rotation position.

Further, when the switching valve 80a is positioned at the second rotation position as shown in FIG. 24, the exhaust gas upstream of the exhaust flow change pipe 80 flows into the particulate filter 22 at the second end thereof through the second exhaust branch pipe 81b. The exhaust gas flowing into the particulate filter 22 at the second end thereof flows out from the particulate filter 22 at the first end thereof to the exhaust pipe 82 downstream of the exhaust flow switching valve 80 through the first exhaust branch pipe 81a.

In this embodiment, as explained in detail in the below, the rotation position of the switching valve 80a is changed alternatively between the first and second rotation positions each time a predetermined period has elapsed to change the direction of the inflow of the exhaust gas into the particulate filter 22. Therefore, the particulates flow in the particulate filter 22 or the partitions 54 thereof so that the particulates are removed by oxidation.

Figure 25:
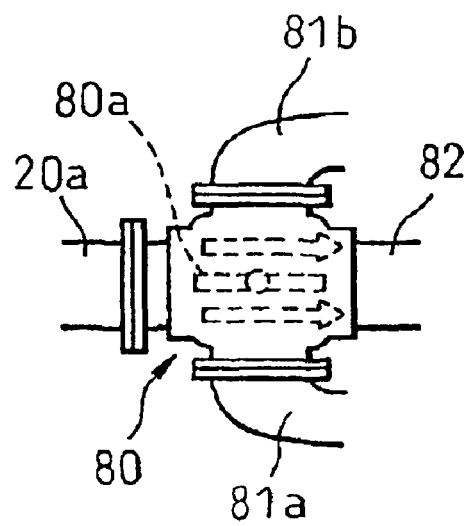
FIG. 25 is a plan view of the bypass mechanism wherein the rotation position of the switching valve is set at a neutral position.

When the switching valve 80a is positioned at a neutral position just intermediate between the first and second rotation positions as shown in FIG. 25, the exhaust gas upstream of the exhaust flow change pipe 80 flows directly into the exhaust pipe 80 downstream of the exhaust flow change pipe 80 without passing the particulate filter 22 as shown by an arrow in FIG. 25.

At the neutral position, the pressure of the exhaust gas at the first end of the particulate filter 22 is generally equal to that at the second end of the particulate filter 22, so almost of the exhaust gas does not flow into the particulate filter 22. Therefore, the exhaust gas is made to bypass the particulate filter 22, so the amount of the exhaust gas flowing into the particulate filter 22 generally becomes zero.

Even if the particulates are removed by oxidation in the particulate filter 22 by using an exhaust gas purification method as explained above, the particulates are sometimes deposited on the surface of the particulate filter 22. If the particulate deposited on the surface of the particulate filter 22 remains as it is, the deposited particulates cover the surface of the particulate filter 22, and thus the exhaust gas may not pass through the particulate filter 22.

Therefore, in this embodiment, when the amount of the particulates deposited on the surface of the particulate filter 22 becomes larger than a predetermined amount, the deposited particulates are forcibly oxidized or gradually burned to remove the particulates from the particulate filter 22. It is possible to oxidize or gradually burn the deposited particulates by raising the temperature of the particulate filter 22 to a certain temperature (For example, a temperature at which the particulates are oxidized.).

For example, it is possible to raise the temperature of the particulate filter 22 by feeding oxygen and hydrocarbon to the particulate filter 22 and then burning the oxygen and hydrocarbon in the particulate filter 22.

Further, when the engine performs the low temperature combustion, exhaust gas having a high temperature is discharged from the engine, so it is also possible to raise the temperature of the particulate filter 22 by performing low temperature combustion.

In this embodiment, when the amount of the deposited particulates becomes relatively large, a temperature raising process to raise the temperature of the particulate filter 22 to a certain temperature, such as the particulate oxidizing temperature, is performed to forcibly oxidize or gradually burn the deposited particulates.

However, during the temperature raising process, the deposited particulates may possibly burn all at once. Further, without performing the temperature raising process, when the temperature of the particulate filter 22 exceeds a temperature at which the particulates are ignited and burn all at once with emitting a luminous flame, the deposited particulates may burn all at once. In this case, the temperature of the particulate filter 22 rises rapidly.

Therefore, a part of the particulate filter 22 may possibly be melted, and thermally damaged by the heat of the burning of the particulates. Otherwise, the active oxygen release agent carried on the particulate filter 22 may possibly be deteriorated by the heat of the burning of the particulates. To prevent the melting of the particulate filter 22 or deterioration of the active oxygen release agent, it is preferable to prevent the deposited particulates from burning.

If the deposited particulates do not burn, however, the amount of the deposited particulates gradually becomes large, so the action of oxidizing the particulates in the particulate filter 22 is suppressed. Consequently, the particulate filter cannot remove the particulates by oxidation. Further, if the fine holes of the partitions 54 of the particulate filter 22 are clogged by the deposited particulates, the exhaust gas cannot pass the particulate filter 22.

In this embodiment, it is judged if the particulate filter 22 will be thermally deteriorated. When it is judged that the particulate filter 22 will be thermally deteriorated, the rotation position of the switching valve 80a is set at the neutral position so that the exhaust gas is made to bypass the particulate filter 22. In this way, oxygen is not fed to the particulate filter 22, so the deposited particulates do not burn.

On the other hand, when it is judged that the particulate filter 22 will not be thermally deteriorated, the rotation position of the switching valve 80a is set at the first or second position so that the exhaust gas flows into the particulate filter 22. In this way, oxygen is fed to the particulate filter 22, so the deposited particulates are forcibly oxidized or gradually burn.

An explanation will be given of a method for judging if the particulate filter will be thermally deteriorated according to this embodiment. Commonly, the larger the amount of the deposited particulates, the larger the amount of the heat produced by the deposited particulates burning all at once. Therefore, when the amount of the deposited particulates is large, the possibility that the particulate filter 22 is thermally deteriorated is high. That is, it is possible to judge if the particulate filter 22 will be thermally deteriorated on the basis of the amount of the deposited particulates.

It has been considered that the amount of the deposited particulates can be estimated on the basis of the difference (pressure loss) in the pressures of the exhaust gas upstream and downstream of the particulate filter 22. According to the recent research, it has been found that, even if the pressure loss is small, the amount of the deposited particulates is sometimes large.

Figure 26:
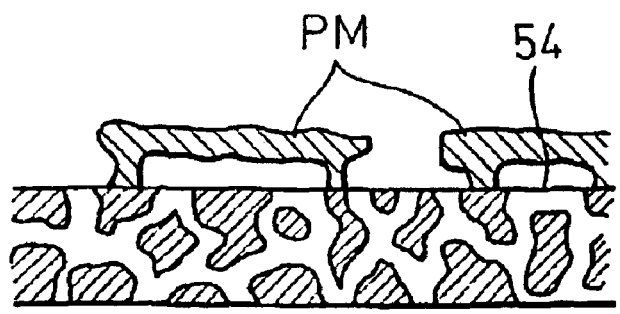
FIG. 26 a view showing deposited particulates.

This is because the particulates PM are deposited on the partitions 54 as shown in FIG. 26, so the deposited particulates do not close inlets of the fine holes of the partitions 54. Mainly, two things, that is, the large amount of heat produced by the deposited particulates burning and the small amount of heat radiated from the particulate filter 22 are deemed to cause the thermal deterioration of the particulate filter 22.

The larger the amount of oxygen flowing into the particulate filter 22, the larger the amount of heat produced by the burning of the deposited particulates. Further, the smaller the amount of the exhaust gas flowing into the particulate filter 22, the smaller the amount of heat radiated from the particulate filter 22.

In this embodiment, when the amount of oxygen flowing into the particulate filter 22 is large or the amount of the exhaust gas flowing into the particulate filter 22 is small under the condition that the temperature of the particulate filter 22 is higher than the particulate ignition temperature, it is judged that the particulate filter 22 will be thermally deteriorated.

On the other hand, when the amount of oxygen flowing into the particulate filter 22 is small or the amount of the exhaust gas flowing into the particulate filter 22 is large even under the condition that the temperature of the particulate filter 22 is higher than the particulate ignition temperature, it is judged that the particulate filter 22 will not be thermally deteriorated.

In this way, if the possibility of the thermal deterioration of the particulate filter 22 is considered, the deposited particulates can be removed from the particulate filter 22 without thermally deteriorating the particulate filter 22.

An explanation will be given in detail of a process for controlling the switching valve, including the above explained processes for preventing the thermal deterioration of the particulate filter and oxidizing the deposited particulates, referring to FIGS. 27–29.

Figure 27:
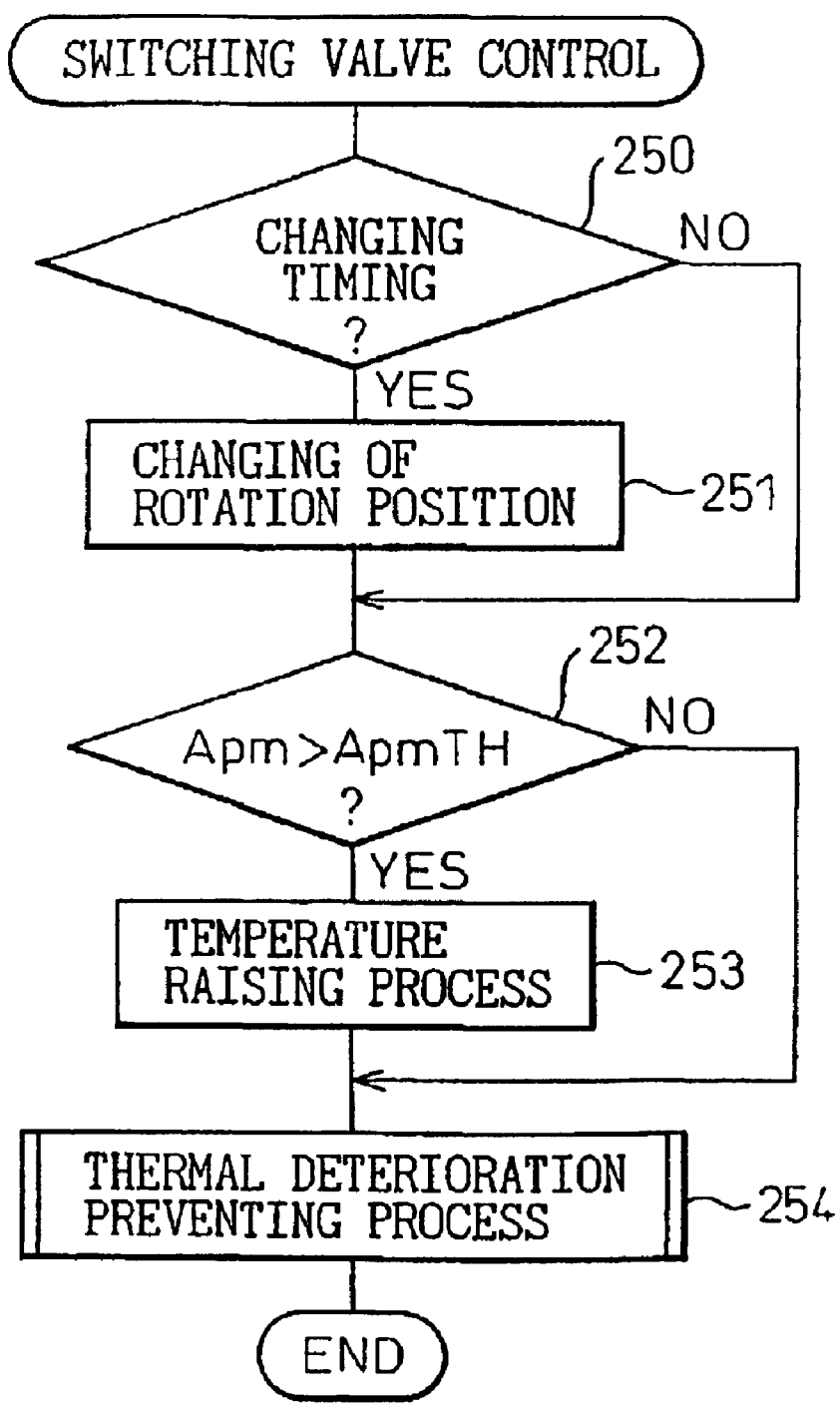
FIG. 27 is a flowchart for controlling the rotation position of the switching valve.

The rotation position of the switching valve 80a is controlled to change from the first rotation position to the second rotation position, or from the second rotation position to the first rotation position according to a flowchart of FIG. 27.

First, at step 250, it is judged if it is the time for changing the rotation position of the switching valve 80a. The time is, for example, each time a constant period has elapsed, or a time when the total amount of the particulates flowing into the particulate filter 22 reaches a certain constant amount, or a time when the engine is decelerated.

At step 250, when it is judged that it is the time for changing the rotation position of the switching valve 80a, the routine proceeds to step 251 where the rotation position of the switching valve 80a is changed.

On the other hand, at step 250, when it is judged that it is not time for changing the rotation position of the switching valve 80a, the routine proceeds to step 252 without changing the rotation position of the switching valve 80a.

At step 252, it is judged if the amount of the particulates Apm flowing into the particulate filter 22 (hereinafter, referred to as inflowing particulate amount) exceeds a predetermined amount ApmTH (Apm>ApmTH). The inflowing particulate amount is calculated using an integration of the emitted particulate amounts, or pressure loss produced by the particulate filter 22 if there is a pressure loss between the upstream and downstream ends of the particulate filter 22, or difference in the particulate amount removable by oxidation and the emitted particulate amount, or an output of a sensor arranged downstream of the particulate filter 22 for detecting the concentration of the particulate.

At step 252, when it is judged that Apm>ApmTH, the routine proceeds to step 253 where a temperature raising process is performed for raising the temperature of the particulate filter 22 to the particulate oxidizing temperature to oxidize the deposited particulates.

On the other hand, at step 252, when it is judged that Apm≦ApmTH, the routine proceeds to step 254 without performing the temperature raising process.

Figure 28:
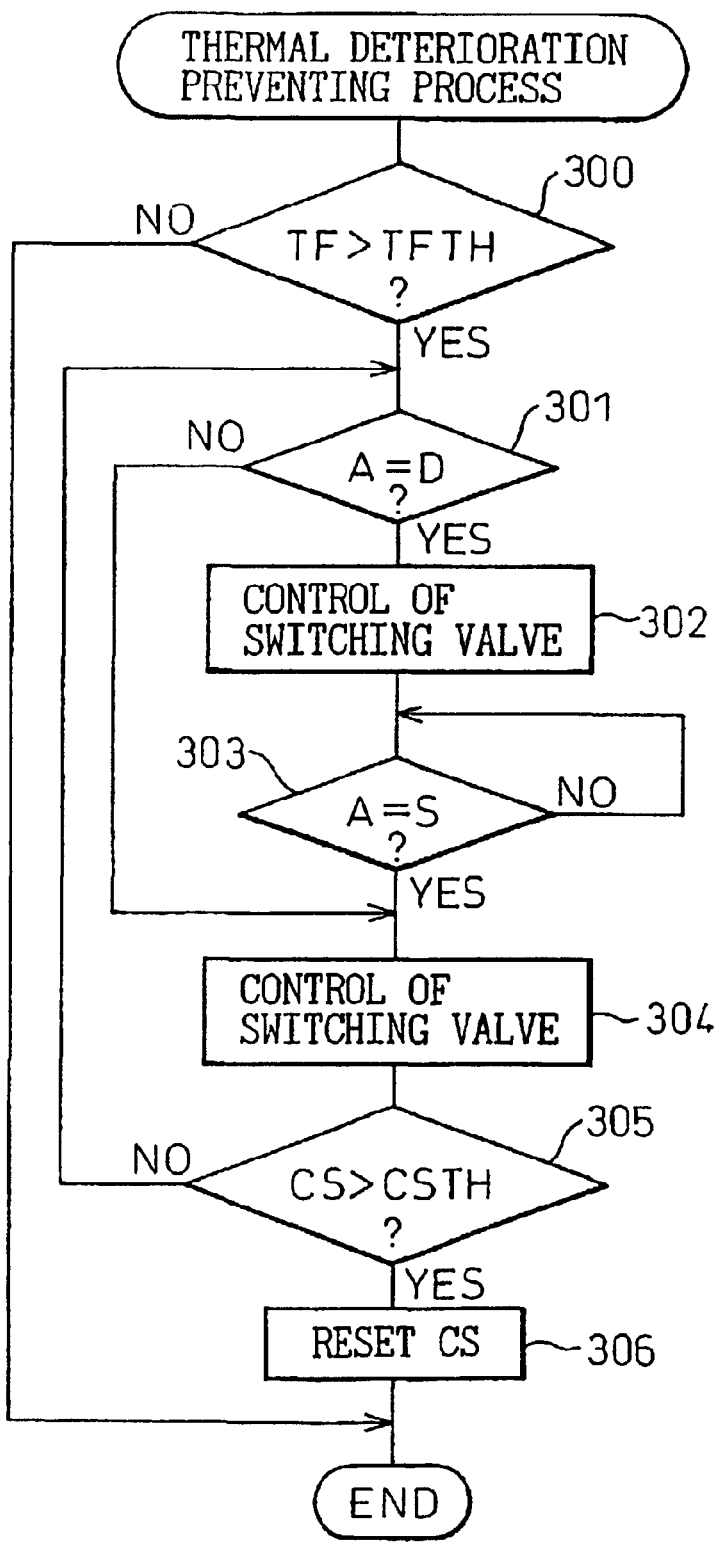
FIG. 28 is a flowchart for performing a process for preventing a thermal deterioration of a first embodiment.

At step 254, the process for preventing the thermal deterioration is performed according to a flowchart of FIG. 28.

An explanation will be given of the process for preventing the thermal deterioration, referring to FIG. 28. First, at step 300, it is judged if the temperature TF of the particulate filter 22 is higher than a predetermined temperature (For example, particulate ignition temperature) TFTH (TF>TFTH).

At step 300, when it is judged that TF≦TFTH, it is considered that the particulate filter 22 will not be thermally deteriorated. Then, the routine is ended.

Figure 29A:
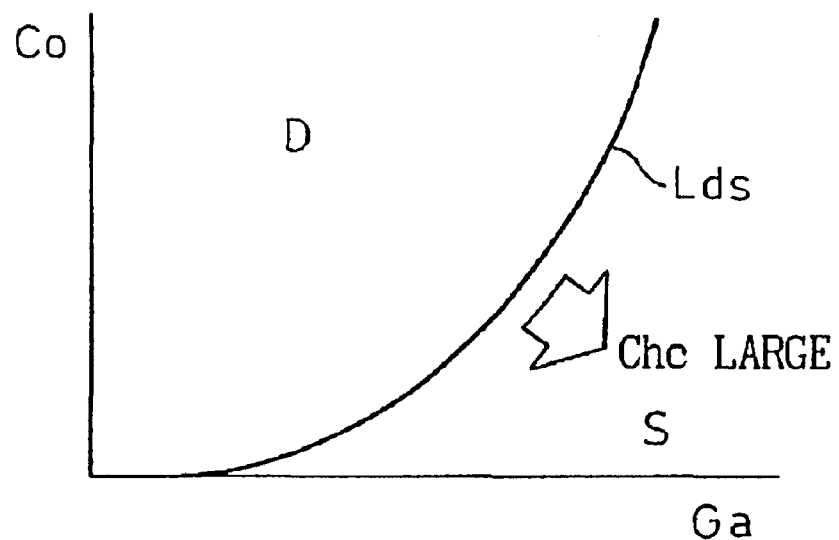
FIGS. 29A and 29B are maps for showing the relationship between a safety area, a dangerous area, an amount of intake air, and a concentration of oxygen.
Figure 29B:
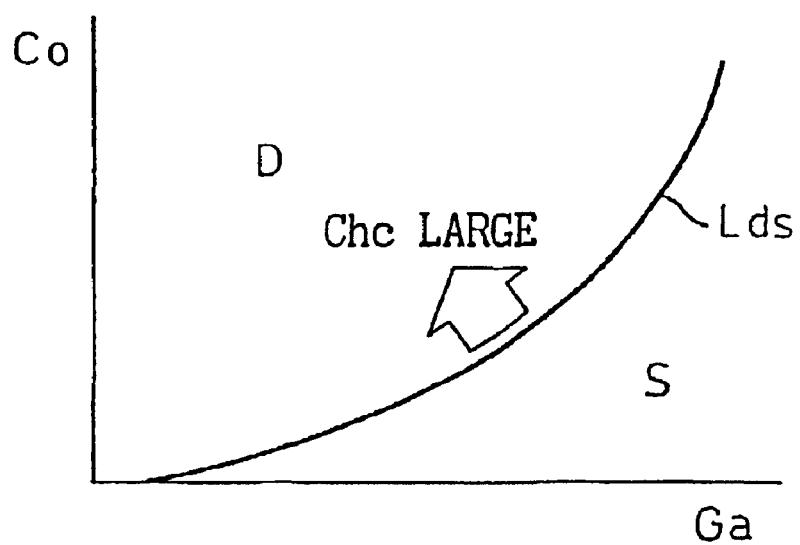

On the other hand, at step 300, when it is judged that TF>TFTH, the routine proceeds to step 301 where it is judged if the present engine operation A is within the region D (A=D) on the basis of a map of FIGS. 29A and 29B. In the map of FIGS. 29A and 29B, the region D is a dangerous region in which the particulate filter 22 will be thermally deteriorated, and the region S is a safety region in which the particulate filter 22 will not be thermally deteriorated.

FIG. 29A shows a map used when the engine is operated under a lean air-fuel ratio. According to the map of FIG. 29A, the smaller the amount of the intake air, the smaller the amount of the exhaust gas passing the particulate filter 22. Therefore, when the amount of the heat radiated from the particulate filter 22 is small, the possibility that the engine operation A is within the dangerous region D is high.

Further, the larger the concentration Co of the oxygen in the exhaust gas, the larger the amount of the oxygen flowing into the particulate filter 22. Therefore, when the concentration Co of the oxygen in the exhaust gas is large, the possibility that the engine operation A is within the dangerous region D is high.

A line Lds for separating the dangerous region D from the safety region S moves toward the safety region S when the concentration Chc of the hydrocarbon (HC) in the exhaust gas becomes large. That is, the possibility that the thermal deterioration occurs becomes large when the concentration Chc of HC in the exhaust gas becomes large.

On the other hand, FIG. 29B shows a map used when the engine is operated under a lean air-fuel ratio close to the stoichiometric air-fuel ratio, or generally under the stoichiometric air-fuel ratio, or under a rich air-fuel ratio.

According to the map of FIG. 29B, the smaller the amount of the intake air, the larger the possibility that the engine operation A is within the dangerous region D.

Further, the larger the concentration Co of the oxygen in the exhaust gas, the larger the possibility that the engine operation A is within the dangerous region D.

A line Lds for separating the dangerous region D from the safety region A moves toward the dangerous region D when the concentration Chc of HC in the exhaust gas becomes large. That is, the possibility that the thermal deterioration occurs becomes large when the concentration Chc of HC in the exhaust gas becomes small.

The reason that the tendency of the change of the possibility of the thermal deterioration according to the change of the concentration of HC in the exhaust gas depends on the air-fuel ratio is as follows.

When the engine is operated under the lean air-fuel ratio, the concentration of the oxygen in the exhaust gas is large. Therefore, even if the concentration of HC in the exhaust gas becomes large and, thus, the oxygen in the exhaust gas reacts with HC and is consumed, the amount of the oxygen remaining in the exhaust gas is sufficient for burning the deposited particulates in the particulate filter 22 for short time.

Further, if the concentration of HC in the exhaust gas becomes large, the amount of HC reacting with the oxygen becomes large. Therefore, the temperature of the particulate filter 22 is largely raised by the reaction of HC with the oxygen, so the possibility of the thermal deterioration becomes large.

On the other hand, when the engine is operated under the lean air-fuel ratio close to the stoichiometric air-fuel ratio, or under the stoichiometric air-fuel ratio, or the rich air-fuel ratio, the amount of the oxygen in the exhaust gas is originally small. Therefore, when the concentration of HC in the exhaust gas becomes large, and thus HC in the exhaust gas reacts with the oxygen, the amount of the oxygen remaining in the exhaust gas is insufficient for burning the deposited particulates all at once, so the possibility of the thermal deterioration becomes small opposite to the case that the engine is operated under the lean air-fuel ratio.

At step 301, when it is judged that A=D, it is considered that the particulate filter 22 will be thermally deteriorated, the routine proceeds to step 302 where a switching valve control is performed to make the rotation position of the switching valve at neutral position, and then the routine proceeds to step 303.

At step 303, it is judged if the engine operation A is within the safety region S (A=S). At step 303, when it is judged that A=S, the routine proceeds to step 304. On the other hand, at step 303, when it is judged that A≈S, that is, AD, step 303 continues to be performed until, at step 303, it is judged that A=S. Therefore, after the rotation position of the switching valve 80a is positioned at the neutral position at step 302, the rotation position of the switching valve 80a is fixed at the neutral position until it is judged that A=S at step 303.

At step 301, if it is judged that A≈D, that is, A=S, it is considered that the particulate filter 22 will not be thermally deteriorated, and then the routine proceeds to step 304.

It may be considered that the particulate filter 22 will not be thermally deteriorated even if the routine is ended to perform the switching valve control shown in FIG. 27 when it is judged that A=S at step 303 and thus the particulate filter 22 will not be thermally deteriorated. However, in this flowchart, steps following step 304 are added to assuredly prevent the thermal deterioration of the particulate filter 22.

That is, the temperature TF of the particulate filter 22 is still higher than the predetermined temperature TFTH even when it is judged that the engine operation A is within the safety region S at step 303. Further, the temperature TF of the particulate filter 22 may be locally high even when the temperature TF of the particulate filter 22 is lower than the predetermined temperature TFTH.

Under these condition, if the routine of FIG. 28 is ended, and the rotation position of the switching valve 80a is changed between the first and second rotation positions, the inflowing direction of the exhaust gas is repeatedly inverted by changing the rotation position of the switching valve 80a, so the heat is concentrated on the central portion of the particulate filter 22, and then the deposited particulates may burn all at once.

In this embodiment, to avoid the burning of the deposited particulates all at once, a safety degree which indicates the possibility that the particulate filter 22 will not be thermally deteriorated is evaluated on the basis of the temperature and amount of the exhaust gas, and the amounts of the oxygen and HC flowing into the particulate filter 22 and, then, only when the safety degree becomes large, is the routine of FIG. 28 ended and the routine returns to that of FIG. 27.

To this end, at step 303, when it is judged that A=S and thus the particulate filter 22 will not be thermally deteriorated, the routine proceeds to step 304 where the rotation position of the switching valve 80a is positioned at the first or second rotation position, and then the routine proceeds to step 305.

Figure 30:
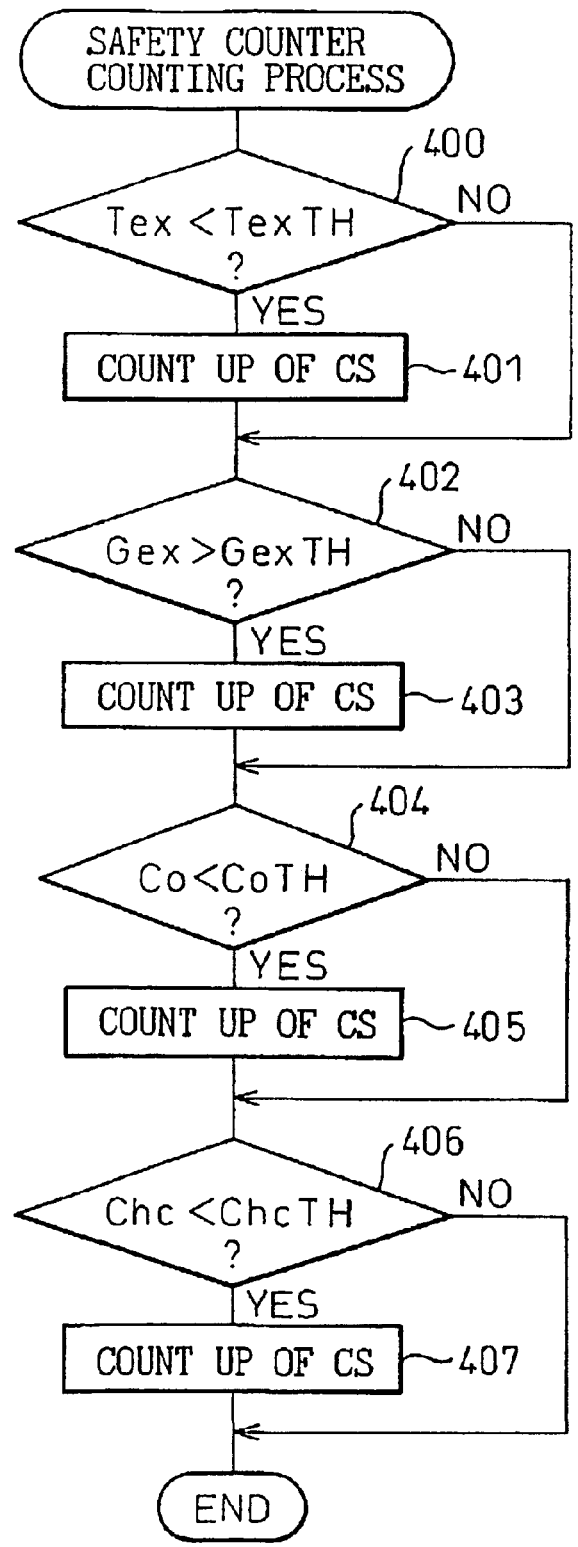
FIG. 30 is a flowchart for counting a safety counter.

At step 305, it is judged if the safety counter CS, which is calculated according to a flowchart of FIG. 30, is larger than a predetermined value CSTH (CS>CSTH).

According to the flowchart of FIG. 30, first, at step 400, it is judged if the temperature Tex of the exhaust gas flowing into the particulate filter 22 is lower than a predetermined temperature TexTH (Tex<TexTH).

At step 400, when it is judged that Tex<TexTH, the routine proceeds to step 401 where the safety counter CS is counted up, and then proceeds to step 402. On the other hand, at step 400, when it is judged that Tex≧TexTH, the routine directly proceeds to step 402.

At step 402, it is judged if the amount Gex of the exhaust gas flowing into the particulate filter 22 is larger than a predetermined amount Gex (Gex>GexTH).

At step 402, when it is judged that Gex>GexTH, the routine proceeds to step 403 where the safety counter CS is counted up, and then proceeds to step 404. On the other hand, when it is judged that Gex≦GexTH, the routine directly proceeds to step 404.

At step 404, it is judged if the amount Co of the oxygen in the exhaust gas flowing into the particulate filter 22 is smaller than a predetermined amount CoTH (Co<CoTH).

At step 404, when it is judged that Co<CoTH, the routine proceeds to step 405 where the safety counter CS is counted up, and then proceeds to step 406. On the other hand, at step 404, when it is judged that Co≧CoTH, the routine directly proceeds to step 406.

At step 406, it is judged if the concentration Chc of HC in the exhaust gas flowing into the particulate filter 22 is smaller than a predetermined concentration ChcTH (Chc<ChcTH). At step 406, when it is judged that Chc<ChcTH, the routine proceeds to step 407 where the safety counter CS is counted up and then is ended. On the other hand, at step 406, when it is judged that Chc≧ChcTH, the routine is ended.

At step 305 of FIG. 28, when it is judged that CS>CSTH on the basis of the safety counter CS calculated as explained above, it is considered that the possibility that the deposited particulates burn all at once is almost zero, and the routine proceeds to step 306 where the safety counter CS is reset, and then is ended.

On the other hand, at step 305, when it is judged that CS≦CSTH, it is considered that the deposited particulates will burn all at once, and the routine returns to step 301. That is, under the condition that the deposited particulates can burn all at once, the engine operation A may enter into the dangerous region D, so the routine returns to step 301 to assuredly prevent the thermal deterioration of the particulate filter 22 even when the engine operation A enters into the dangerous region D.

In the above explained process for preventing the thermal deterioration, at step 304, after the rotation position of the switching valve 80a is positioned at the first or second rotation position, the rotation position of the switching valve 80a is fixed until the safety degree becomes larger than a certain threshold under the present engine operation.

However, an injector arranged in the exhaust pipe may inject water or nitrogen to the particulate filter 22 to force the temperature of the particulate filter 22 lower, thereby making the safety degree larger than the certain threshold. Alternatively, using only the temperature of the particulate filter 22 instead of the safety degree, when the temperature TF of the particulate filter 22 becomes lower than the predetermined temperature TFTH, or lower than a temperature lower than the predetermined temperature TFTH, the routine may return to the flowchart of FIG. 27.

Next, an explanation will be given of a process for preventing the thermal deterioration of the second embodiment of the invention. In this embodiment, immediately after it is judged that the engine operation is within the dangerous region, the exhaust gas is made not to bypass the particulate filter.

In this embodiment, it is judged if the engine operation will move into the safety region within a range permitted in consideration of several matters such as cost of fuel or required engine load when the engine operating condition is changed. When it is judged that the engine operation will move into the safety region within the permitted range, the engine operating condition is changed to move the engine operation into the safety region.

The parameters for determining if the engine operation is within the safety region or the dangerous region are the temperature of the particulate filter 22, the concentration of the oxygen in the exhaust gas, the amount of the intake air, and the concentration of HC in the exhaust gas.

Therefore, in order to move the engine operation into the safety region, when the engine is operated under a relatively large air-fuel ratio, the temperature of the particulate filter 22 is lowered, or the concentration of the oxygen in the exhaust gas is reduced, or the amount of the intake air is increased, or the concentration of HC in the exhaust gas is reduced. Further, when the engine is operated under a relatively small air-fuel ratio, the concentration of HC in the exhaust gas is increased.

In order to lower the temperature of the particulate filter 22, for example, the pressure of the injection of the fuel from the fuel injector is increased and the timing thereof is delayed.

In order to increase the amount of the intake air, for example, the EGR rate is reduced, or if necessary, the EGR rate is reduced to zero, or the transmission gear ratio is increased compared with the present ratio to increase the engine speed if the engine comprises an automatic gear ratio transmission.

When the EGR rate is reduced to zero, the speed of the fuel combustion in the combustion chamber 5 becomes very fast, and thus the level of the noise derived from the fuel combustion may become larger than a permitted level, so it is preferable that a pilot injection is performed for preliminarily injecting a small amount of fuel before fuel is injected into the combustion chamber 5, or that the pressure of the fuel injection is reduced to suppress the increase of the level of the noise derived from the fuel combustion.

In order to reduce the concentration of the oxygen in the exhaust gas, the air-fuel ratio is reduced, or the EGR rate is increased.

It is preferable that the air-fuel ratio is reduced when the engine is operated under a relatively small air-fuel ratio, such as when the low temperature combustion is performed, or when fuel injection is performed at the combustion stroke other than the fuel injection to inject fuel for operating the engine.

In this way, it is possible to avoid that the exhaust gas including particulate directly discharges to the outside air without passing the particulate filter 22 when the engine operating condition is changed. When the engine operation does not enter into the safety region even if the engine operating condition is changed, a process similar to the process for preventing the thermal deterioration of the first embodiment is performed so that the exhaust gas is made to bypass the particulate filter 22.

Figure 31:
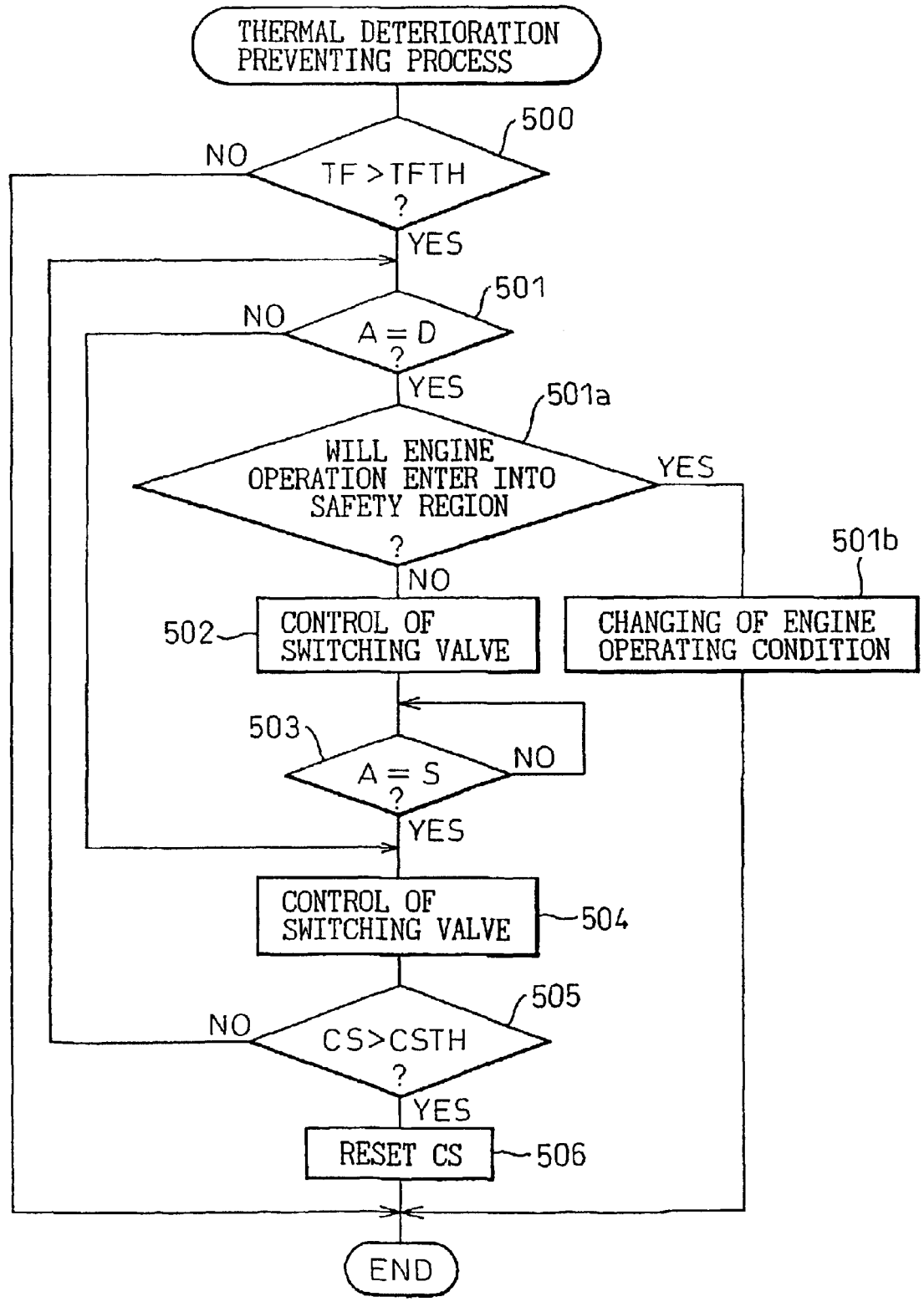
FIG. 31 is a flowchart for performing a process for preventing a thermal deterioration of a second embodiment.

FIG. 31 shows a flowchart for performing the process for preventing the thermal deterioration of the second embodiment. In the flowchart shown in FIG. 31, steps 500–506 except for steps 501a and 501b correspond to steps 300–306 of FIG. 28.

In the flowchart shown in FIG. 31, at step 501, when it is judged that the engine operation A is within the dangerous region D (A=D), the routine proceeds to step 501a where it is judged if the engine operation A will move into the safety region S by changing the engine operating condition.

At step 501a, when it is judged that engine operation A will move into the safety region S, the routine proceeds to step 501b where the engine operating condition is changed so that the engine operation A enters into the safety region S.

On the other hand, at step 501a, when it is judged that engine operation A will not be able to move into the safety region S, the routine proceeds to step 502. The remaining steps are the same as those of FIG. 31, so explanations thereof are eliminated.

When the amount of the exhaust gas flowing into the particulate filter 22 should be reduced, in order to burn the deposited particulates in the particulate filter 22 gradually and not all at once, the bypass mechanism shown in FIGS. 22–25 may be used to pass a small amount of exhaust gas into the particulate filter 22.

In this case, the rotation position of the switching valve 80 is positioned at a position slightly displaced from the neutral position toward the first or second rotation position. In this way, a difference in pressures at the first and second ends of the particulate filter 22 occurs, so a small amount of the exhaust gas flows into the particulate filter 22.

Next, an explanation will be given of a process for removing the deposited particulates by oxidation of the third embodiment, including preventing the thermal deterioration of the particulate filter, by referring to FIG. 32. The process for preventing the thermal deterioration of the particulate filter of this embodiment uses several concepts used in the first and second embodiments, and further includes a process for removing $SO_x$ from the particulate filter.

Figure 32:
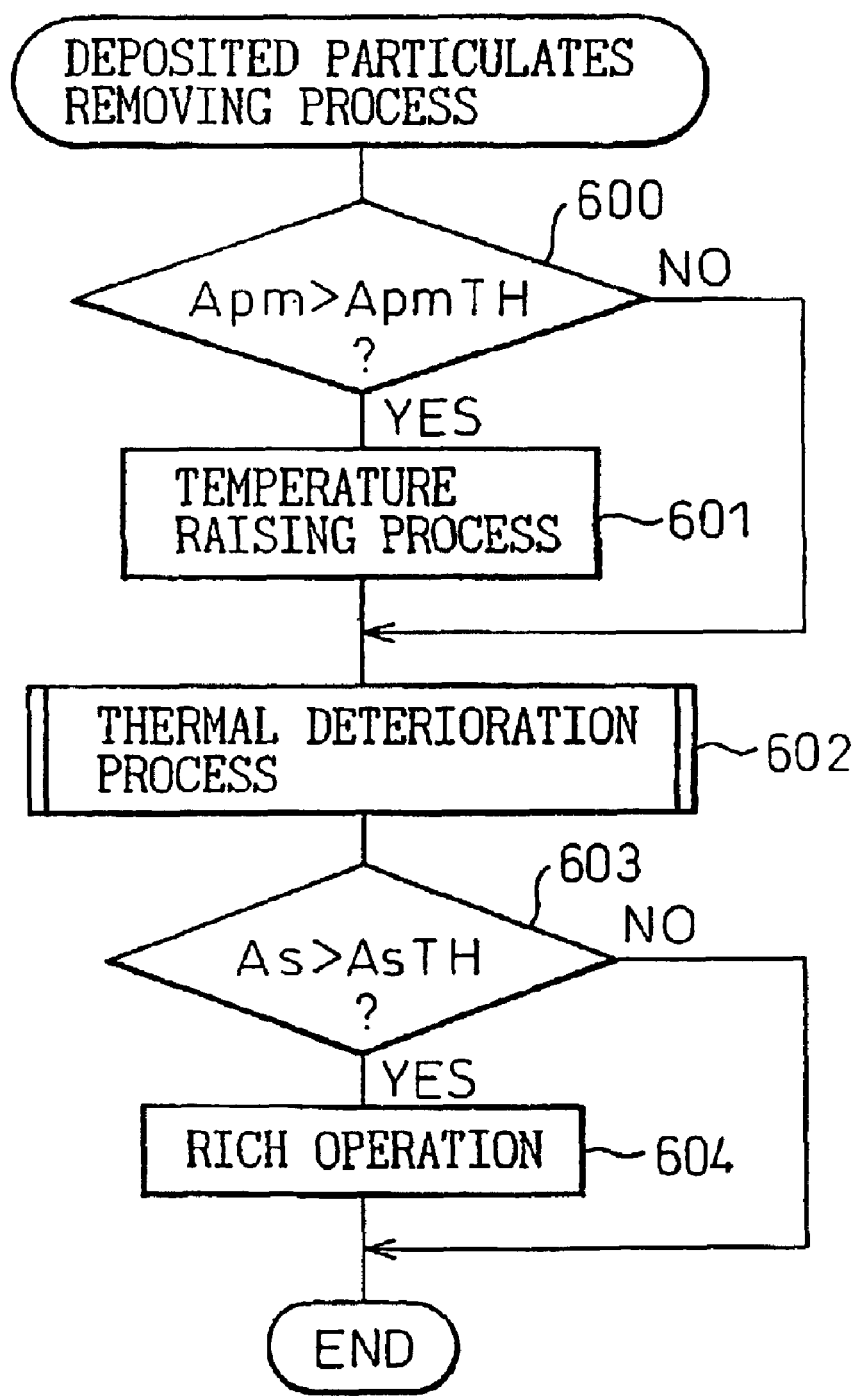
FIG. 32 is a flowchart for removing deposited particulates.

In a flowchart shown in FIG. 32, first, at step 600, it is judged if the amount of the deposited particulates Apm is larger than a predetermined amount ApmTH (Apm>ApmTH). The amount of the deposited particulates Apm is, for example, calculated by integrating an amount of the deposited particulates per unit time which is previously obtained by an experiment as a function of the engine speed N and the required engine load L.

At step 600, when it is judged that Apm>ApmTH, that is, it is judged that the deposited particulates should be removed by oxidation, the routine proceeds to step 601 where a temperature raising process is performed for raising the temperature of the particulate filter 22 to the particulate oxidable temperature, and then proceeds to step 602.

For example, in order to raise the temperature of the particulate filter, the low temperature combustion is performed. Alternatively, in order to raise the temperature of the particulate filter, an exhaust throttle valve arranged in the exhaust passage may be closed to increase the required engine load, thus increasing the amount of the injected fuel.

Further, in order to raise the temperature of the particulate filter, a small amount of the fuel may be injected during the combustion stroke other than the fuel for operating the engine, and burned to raise the temperature of the exhaust gas.

On the other hand, at step 600, it is judged that Apm ≦ApmTH, the routine directly proceeds to step 602.

Figure 33:
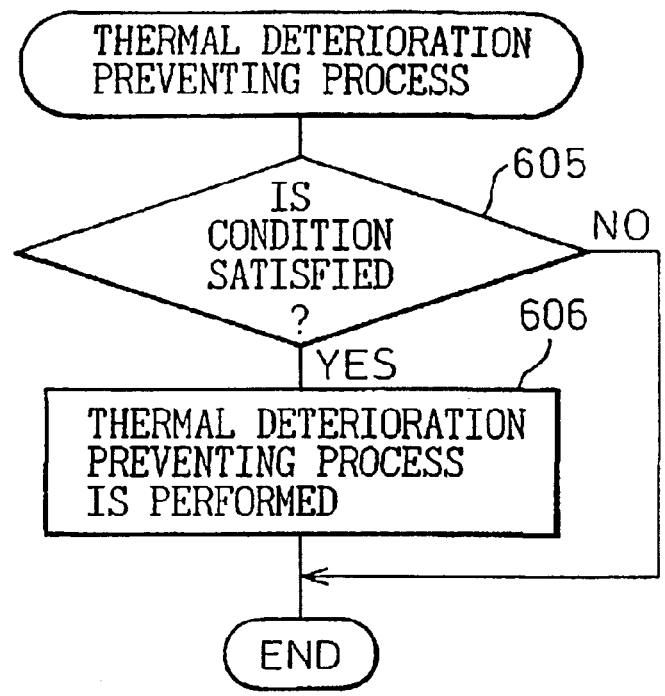
FIG. 33 is a flowchart for preventing the thermal deterioration.

At step 602, a process for preventing the thermal deterioration is performed according to a flowchart shown in FIG. 33. In the flowchart shown in FIG. 33, first, at step 605, it is judged if a condition (thermal deterioration preventing condition), that the process for preventing the thermal deterioration should be performed, is satisfied. Further, this is judged according to a flowchart shown in FIG. 34.

Figure 34:
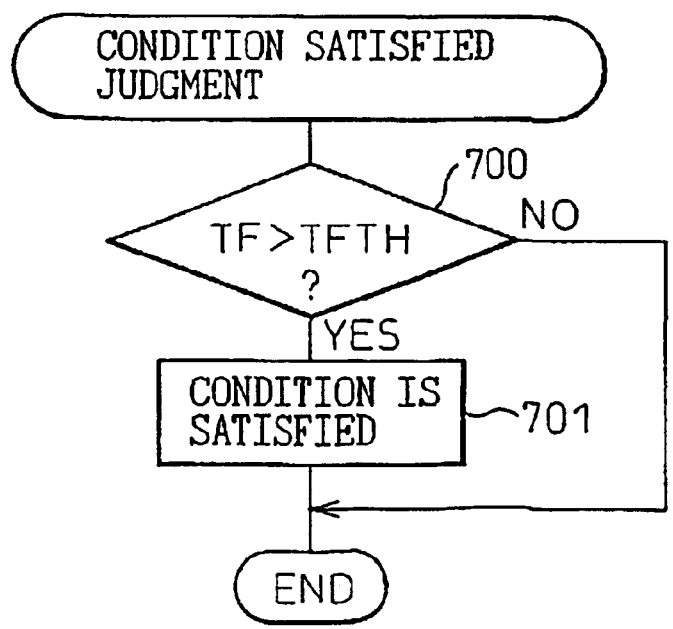
FIG. 34 is a flowchart for judging if a thermal deterioration preventing condition is satisfied.

In the flowchart shown in FIG. 34, first, at step 700, it is judged if the temperature TF of the particulate filter 22 is higher than a predetermined temperature TFTH (TF>TFTH). The predetermined temperature is, for example, set at the particulate ignition temperature.

At step 700, when it is judged that TF>TFTH, the routine proceeds to step 701 where it is judged that the thermal deterioration preventing condition is satisfied.

On the other hand, at step 700, when it is judged that TF≦TFTH, it is judged that the thermal deterioration preventing condition is not satisfied, and then the routine is ended.

At step 605 of FIG. 33, when the thermal deterioration preventing condition is satisfied, the routine proceeds to step 606 where the process for preventing the thermal deterioration is performed.

In the process for preventing the thermal deterioration, the exhaust gas is made to bypass the particulate filter 22 to make the amount of the exhaust gas flowing into the particulate filter 22 lower than a first threshold, preferably generally zero, or the amount of the intake air is reduced to make the amount of the exhaust gas flowing into the particulate filter 22 lower than a first threshold, or the engine speed is increased to make the amount of the exhaust gas flowing into the particulate filter 22 larger than a second threshold.

The first threshold is the amount of the exhaust gas which is small sufficient for suppressing the burning of the deposited particulates. The second threshold is the amount of the exhaust gas which is large enough to radiating the heat of the burning of the deposited particulates to prevent the thermal deterioration of the particulate filter 22.

The process for preventing the thermal deterioration is stopped after a predetermined period has elapsed, and then the normal process starts to be performed. The predetermined period is, for example, a period sufficient for lowering the temperature of the particulate filter 22 to near the particulate oxidizing temperature.

At step 603 of FIG. 32, it is judged if the amount As of the sulfur S adhered to the particulate filter 22 is larger than a predetermined amount AsTH (As>AsTH).

The sulfur S contained in the exhaust gas adheres to the surface of the particulate filter 22. When the particulate filter 22 comprises $NO_x$ absorbent having $NO_x$ absorbing and discharging capacity which absorbs and holds $NO_x$ when the oxygen is excessive in the surroundings, and discharges the held $NO_x$ when the concentration of the oxygen in the surroundings lowers, the adhering sulfur suppresses the $NO_x$ absorbing and discharging capacity.

Therefore, in this flowchart, at step 603, when it is judged that the amount of the adhering sulfur S is relatively large, a process is performed for removing the adhering sulfur S from the particulate filter 22.

Note that the active oxygen release agent is used with the precious metal catalyst such as platinum Pt. Further, as the active oxygen release agent, use is made of at least one of an alkali metal such as potassium K, sodium Na, lithium Li, cesium Cs, and rubidium Rb, an alkali earth metal such as barium Ba, calcium Ca, and strontium Sr, a rare earth such as lanthanum La, yttrium Y, and cerium Ce, a transition metal such as iron Fe, and a carbon family element such as tin Sn.

In detail, at step 603, it is judged that As>AsTH, the routine proceeds to step 604 where the engine is operated under the rich air-fuel ratio to make the air-fuel ratio of the exhaust gas richer than the stoichiometric air-fuel ratio. Thereby, the concentration of the oxygen in the particulate filter 22 is reduced while the hydrocarbon in the exhaust gas reacts with the oxygen to raise the temperature of the particulate filter 22. Therefore, the sulfur S adhering to the particulate filter 22 is disassociated from the particulate filter 22.

The temperature for disassociating the sulfur from the particulate filter 22 is higher than the particulate oxidizing temperature, so it is preferable, in view of energy efficiency, that the temperature of the particulate filter 22 is raised to the sulfur disassociating temperature after the temperature of the particulate filter 22 is raised to the particulate oxidizing temperature at step 601.

As explained above, in this embodiment, when the amount of deposited particulates is larger than the predetermined amount, the temperature raising process is performed. Alternatively, the temperature raising process may be performed when the difference in the pressures (pressure loss) of the exhaust gas upstream and downstream of the particulate filter 22 is larger than a predetermined level if the pressure loss occurs.

Further, as explained above, in this embodiment, it is judged if the thermal deterioration preventing process should be performed on the basis of the temperature of the particulate filter 22. Alternatively, in addition to the temperature of the particulate filter 22, the amount of the intake air flowing into the combustion chamber, or the amount of the exhaust gas flowing into the particulate filter 22 (inflowing exhaust gas amount) may be used to judge if the thermal deterioration preventing process should be performed.

Figure 35:
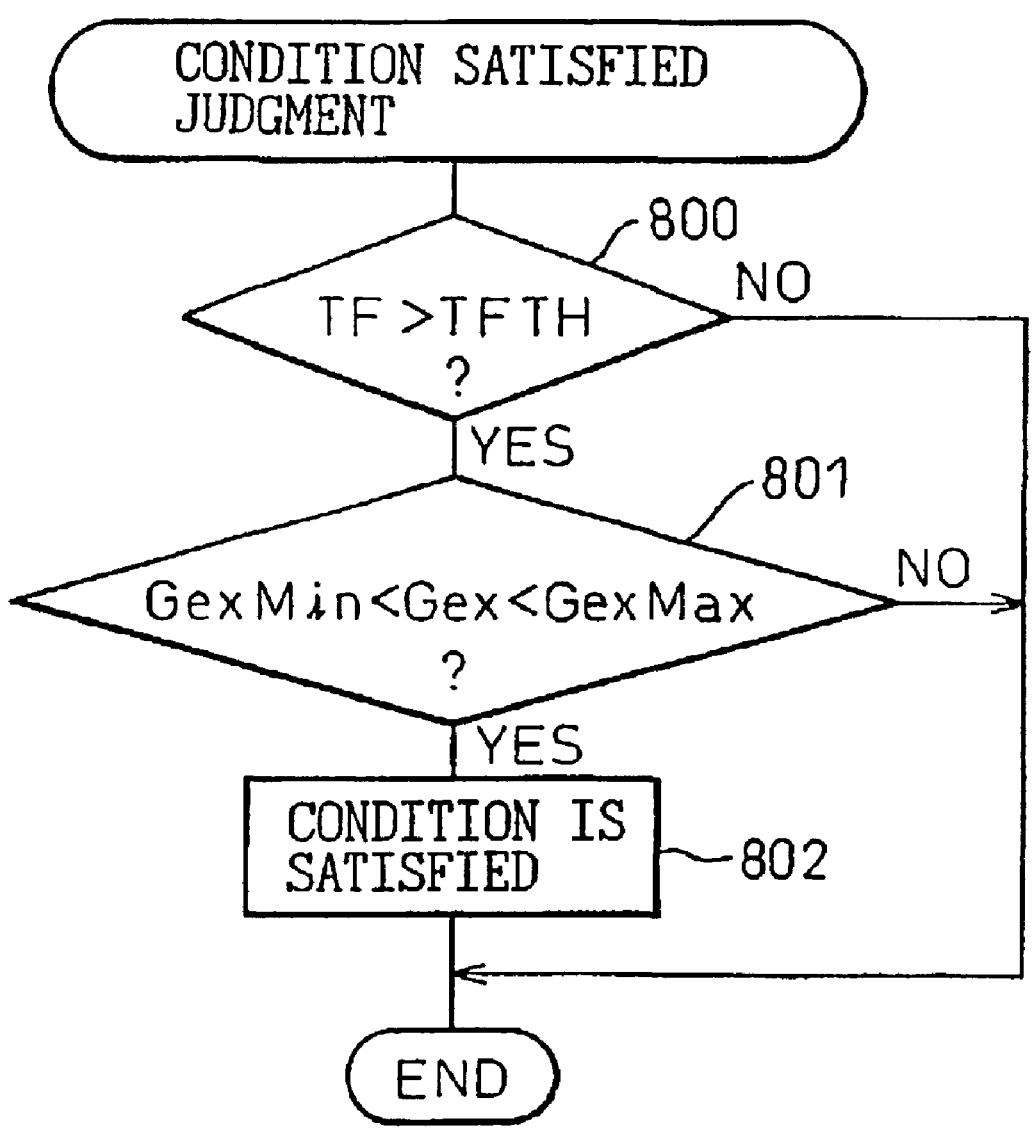
FIG. 35 is a flowchart for judging if a thermal deterioration preventing condition is satisfied according to another embodiment.

FIG. 35 shows a flowchart of another embodiment for judging if the thermal deterioration preventing condition is satisfied on the basis of the temperature TF of the particulate filter 22 and the inflowing exhaust gas amount Gex.

In the flowchart shown in FIG. 35, first, at step 800, it is judged if the temperature TF of the particulate filter 22 is higher than the predetermined temperature TFTH (TF>TFTH).

At step 800, when it is judged that TF>TFTH, the routine proceeds to step 801 where it is judged if the inflowing exhaust gas amount Gex is larger than a minimum amount GexMin and is smaller than a maximum amount GexMax (GexMin<Gex<GexMax).

At step 801, when it is judged that GexMin<Gex<Gexmax, that is, when it is judged that the temperature of the particulate filter 22 is higher than the particulate ignition temperature, and the inflowing exhaust gas amount is insufficient for rapidly radiating the heat of the burning of the deposited particulates, and the inflowing oxygen amount is sufficient for promoting the burning of the deposited particulates, it is considered that the thermal deterioration of the particulate filter 22 should be prevented, so the routine proceeds to step 802 where it is judged that the thermal deterioration preventing condition is satisfied.

Note that the present invention can also be applied to an exhaust gas purification apparatus designed to arrange an oxidation catalyst in the exhaust passage upstream of the particulate filter, convert the NO in the exhaust gas to $NO_2$ by this oxidation catalyst, cause the $NO_2$ and the particulates deposited on the particulate filter to react, and use this $NO_2$ to oxidize the particulates.

According to the present invention, as explained above, it is possible to continuously oxidize and remove the particulates in the exhaust gas on the particulate filter while purifying the $NO_x$ in the exhaust gas well.

While the invention has been described with reference to specific embodiments chosen for purpose of illustration, it should be apparent that numerous modifications could be made thereto by those skilled in the art without departing from the basic concept and scope of the invention.

What is claimed is:

1. An exhaust gas purification apparatus for an engine having a combustion chamber, comprising an exhaust passage, a particulate filter arranged in the exhaust passage for removing particulates in exhaust gas exhausted from the combustion chamber by oxidation, a device for controlling characteristic of the exhaust gas flowing into the particulate filter, and means for judging if the particulate filter will be deteriorated by heat derived from the oxidation of the particulates, wherein, when the judging means judges that the particulate filter will be deteriorated by heat, the controlling device changes the characteristic of the exhaust gas flowing into the particulate filter to prevent the particulate filter from being deteriorated by heat; and wherein the controlling device is adapted to control the amount of the exhaust gas flowing into the particulate filter and wherein, when the judging means judges that the particulate filter will be deteriorated by heat, the controlling device performs one of a first control operation to make the amount of the exhaust gas flowing into the particulate filter smaller than a first threshold and a second control operation to make the amount of the exhaust gas flowing into the particulate filter larger than a second threshold which is larger than the first threshold, and the particulates adhering on the particulate filter are oxidized by temporarily making the air-fuel ratio of a part or whole of the exhaust gas rich.

2. An exhaust gas purification apparatus, as set forth in claim 1, wherein the apparatus further comprises a bypass mechanism for making at least a part of the exhaust gas bypass the particulate filter, and wherein the controlling device makes the amount of the exhaust gas flowing into the particulate filter smaller than the first threshold by the bypass mechanism making at least a part of the exhaust gas bypass the particulate filter.

3. An exhaust gas purification apparatus, as set forth in claim 1, wherein the controlling device makes the amount of the exhaust gas flowing into the particulate filter smaller than the first threshold by reducing the amount of the air taken into the combustion chamber, and makes the amount of the exhaust gas flowing into the particulate filter larger than the second threshold by increasing the amount of the air taken into the combustion chamber.

4. An exhaust gas purification apparatus, as set forth in claim 3, wherein the controlling device reduces the amount of the air taken into the combustion chamber by reducing the engine speed, and increases the amount of the air taken into the combustion chamber by increasing the engine speed.

5. An exhaust gas purification apparatus, for an engine having a combustion chamber, comprising an exhaust passage, a particulate filter arranged in the exhaust passage for removing particulates in exhaust gas exhausted from the combustion chamber by oxidation, a device for controlling characteristic of the exhaust gas flowing into the particulate filter, and means for judging if the particulate filter will be deteriorated by heat derived from the oxidation of the particulates, wherein, when the judging means judges that the particulate filter will be deteriorated by heat, the controlling device changes the characteristic of the exhaust gas flowing into the particulate filter to prevent the particulate filter from being deteriorated by heat; and wherein the judging means judges that the particulate filter will be deteriorated by heat when the temperature of the particulate filter is higher than a predetermined temperature and the concentration of the oxygen in the exhaust gas is larger than a predetermined concentration.

6. An exhaust gas purification apparatus, as set forth in claim 5, wherein the predetermined temperature is a temperature at which the particulate is ignited.

7. An exhaust gas purification apparatus, as set forth in claim 5, wherein the predetermined concentration is set to become small as the concentration of hydrocarbon in the exhaust gas becomes large when the air-fuel ratio of the exhaust gas is lean, and is set to become large as the concentration of hydrocarbon in the exhaust gas becomes large when the air-fuel ratio of the exhaust gas is stoichiometric or rich.

8. An exhaust gas purification apparatus, as set forth in claim 5, wherein the predetermined concentration is set to become large as the amount of the air taken into the combustion chamber becomes large.

9. An exhaust gas purification apparatus, for an engine having a combustion chamber, comprising an exhaust passage, a particulate filter arranged in the exhaust passage for removing particulates in exhaust gas exhausted from the combustion chamber by oxidation, a device for controlling characteristic of the exhaust gas flowing into the particulate filter, and means for judging if the particulate filter will be deteriorated by heat derived from the oxidation of the particulates, wherein, when the judging means judges that the particulate filter will be deteriorated by heat, the controlling device changes the characteristic of the exhaust gas flowing into the particulate filter to prevent the particulate filter from being deteriorated by heat; and wherein, when the judging means judges that the particulate filter will be deteriorated by heat, before the characteristic of the exhaust gas is changed by the controlling device, the judging means judges if the temperature of the particulate filter will become lower than the predetermined temperature by changing the characteristic of the exhaust gas, and if the concentration of the oxygen in the exhaust gas will become smaller than the predetermined concentration by changing the characteristic of the exhaust gas, and the controlling device changes the characteristic of the exhaust gas to make the temperature of the particulate filter lower than the predetermined temperature when the judging means judges that the temperature of the particulate filter will become lower than the predetermined temperature by changing the characteristic of the exhaust gas, and the controlling device changes the characteristic of the exhaust gas to make the concentration of the oxygen in the exhaust gas smaller than the predetermined concentration when the judging means judges that the concentration of the oxygen in the exhaust gas will become smaller than the predetermined concentration.

10. An exhaust gas purification apparatus, as set forth in claim 9, wherein the controlling device controls the characteristic of the exhaust gas by controlling the engine operating condition.

11. An exhaust gas purification apparatus, as set forth in claim 9, wherein the apparatus further comprises a bypass mechanism for making at least a part of the exhaust gas bypass the particulate filter, and wherein the controlling device makes at least a part of the exhaust gas bypass the particulate filter by the bypass mechanism when the judging means judges that, by changing the characteristic of the exhaust gas, the temperature of the particulate filter will not become lower than the predetermined temperature, and the concentration of the oxygen in the exhaust gas will not become smaller than the predetermined concentration.

12. An exhaust gas purification apparatus, for an engine having a combustion chamber, comprising an exhaust passage, a particulate filter arranged in the exhaust passage for removing particulates in exhaust gas exhausted from the combustion chamber by oxidation, a device for controlling characteristic of the exhaust gas flowing into the particulate filter, and means for judging if the particulate filter will be deteriorated by heat derived from the oxidation of the particulates, wherein, when the judging means judges that the particulate filter will be deteriorated by heat, the controlling device changes the characteristic of the exhaust gas flowing into the particulate filter to prevent the particulate filter from being deteriorated by heat; and wherein the apparatus further comprises a reverse mechanism for reversing the inflowing direction of the exhaust gas flowing into the particulate filter.

* * * * *